United States Patent
Kim et al.

(10) Patent No.: US 8,615,781 B2
(45) Date of Patent: *Dec. 24, 2013

(54) METHOD OF PROCESSING CHANNEL INFORMATION AND RECEIVER

(75) Inventors: Jin Pil Kim, Seoul (KR); Ho Taek Hong, Seoul (KR); Joon Hui Lee, Seoul (KR); Jae Hyung Song, Seoul (KR)

(73) Assignee: LG Electronics Inc., Seoul (KR)

( * ) Notice: Subject to any disclaimer, the term of this patent is extended or adjusted under 35 U.S.C. 154(b) by 604 days.

This patent is subject to a terminal disclaimer.

(21) Appl. No.: 12/007,260

(22) Filed: Jan. 8, 2008

(65) Prior Publication Data

US 2008/0178248 A1 Jul. 24, 2008

Related U.S. Application Data

(60) Provisional application No. 60/879,046, filed on Jan. 8, 2007.

(30) Foreign Application Priority Data

| Jun. 5, 2007 | (KR) | 10-2007-0054906 |
| Jun. 5, 2007 | (KR) | 10-2007-0054907 |
| Jun. 5, 2007 | (KR) | 10-2007-0054908 |

(51) Int. Cl.
| G06F 3/00 | (2006.01) |
| G06F 13/00 | (2006.01) |
| H04N 5/445 | (2011.01) |
| H04N 7/173 | (2011.01) |

(52) U.S. Cl.
USPC ............. 725/109; 725/48; 725/52; 725/56; 725/59; 725/110; 725/118

(58) Field of Classification Search
USPC .................................................. 725/37–61
See application file for complete search history.

(56) References Cited

U.S. PATENT DOCUMENTS

| 5,579,055 A | 11/1996 | Hamilton et al. |
| 5,850,249 A | 12/1998 | Massetti et al. |
| 5,982,411 A | 11/1999 | Eyer et al. |
| 6,003,041 A | 12/1999 | Wugofski |
| 6,157,411 A | 12/2000 | Williams et al. |
| 6,249,320 B1 * | 6/2001 | Schneidewend et al. ...... 348/569 |
| 6,529,680 B1 * | 3/2003 | Broberg .......................... 386/83 |
| 6,583,825 B1 * | 6/2003 | Yuen et al. ..................... 348/731 |
| 6,732,372 B2 * | 5/2004 | Tomita et al. ................... 725/47 |
| 6,904,609 B1 | 6/2005 | Pietraszak et al. |
| 7,546,623 B2 | 6/2009 | Ramraz et al. |

(Continued)

FOREIGN PATENT DOCUMENTS

| JP | 2002-112128 A | 4/2002 |
| JP | 2003153120 A | 5/2003 |

(Continued)

*Primary Examiner* — Mushfikh Alam
(74) *Attorney, Agent, or Firm* — McKenna Long & Aldridge LLP

(57) ABSTRACT

A method of processing channel information of a transmitter/receiver, and a receiver are disclosed. The method of processing channel information in the receiver receives at least two of provider identification information, region identification information, content source identification information, content genre identification information, content data characteristic identification information, channel level identification information and content existing channel number identification information, forms multi-part channel information using the received identification information according to a preset channel information format, and connects to a content service server providing content service corresponding to the multi-part channel information.

18 Claims, 14 Drawing Sheets

(56) References Cited

U.S. PATENT DOCUMENTS

| | | |
|---|---|---|
| 7,634,792 B2 | 12/2009 | Michel et al. |
| 2003/0056216 A1* | 3/2003 | Wugofski et al. ............... 725/46 |
| 2003/0135856 A1* | 7/2003 | Hancock et al. ................ 725/50 |
| 2004/0105031 A1* | 6/2004 | Shibusawa .................... 348/570 |
| 2004/0168189 A1* | 8/2004 | Reynolds et al. .............. 725/42 |
| 2005/0010947 A1* | 1/2005 | Ellis ................................ 725/38 |
| 2005/0160453 A1* | 7/2005 | Kim ................................ 725/39 |
| 2006/0064722 A1* | 3/2006 | Michel et al. .................. 725/47 |
| 2006/0156362 A1 | 7/2006 | Perrot |
| 2007/0016932 A1 | 1/2007 | Franken et al. |
| 2007/0039022 A1 | 2/2007 | Kim et al. |
| 2007/0050812 A1 | 3/2007 | Ebata et al. |
| 2007/0050820 A1* | 3/2007 | Saarikivi et al. ............... 725/62 |
| 2007/0061842 A1* | 3/2007 | Walter et al. ................... 725/48 |
| 2007/0089149 A1* | 4/2007 | You et al. ..................... 725/105 |
| 2007/0174862 A1* | 7/2007 | Kushida et al. ................ 725/15 |
| 2007/0192800 A1* | 8/2007 | Walter et al. ................... 725/53 |
| 2007/0250895 A1 | 10/2007 | Yamada |
| 2008/0016540 A1* | 1/2008 | Savoor et al. ................ 725/112 |
| 2008/0127288 A1* | 5/2008 | Begeja et al. ................ 725/109 |
| 2009/0077600 A1* | 3/2009 | Lin et al. ........................ 725/99 |
| 2010/0115553 A1 | 5/2010 | Van Flandern et al. |
| 2010/0205645 A1 | 8/2010 | Tokoshima et al. |

FOREIGN PATENT DOCUMENTS

| | | |
|---|---|---|
| KR | 10-2001-0107623 A | 12/2001 |
| KR | 10-2005-0043315 | 5/2005 |
| KR | 20050075546 A | 7/2005 |
| KR | 20050075549 A | 7/2005 |
| KR | 20060072003 A | 6/2006 |
| KR | 10-2006-0077920 A | 7/2006 |
| WO | WO 2005/046239 | 5/2005 |

* cited by examiner

FIG. 1

| Part | Code | Text | Description |
|---|---|---|---|
| CP | 0~999 | "MBC" | code value or text value representing Content Provider |
| SP | 0~99 | "HanaTV" | code value or text value representing Service Provider |
| NP | 0~99 | "DACOM" | code value or text value representing Network Provider |
| Sequential Number (HNED) | 0~999 | | HNED (Home Network End Device) Namely, unique sequential number code value at customer side |

FIG. 2

| type | Code value |
|---|---|
| IPTV Content region code | administrative computer network region code |
| IPTV service region code | administrative computer network region code |
| IPTV service network region code | administrative computer network region code |
| IPTV service user region code | administrative computer network region code |

FIG. 3

AABBCCCC00 : AA (city, province)  BB (city, county, district)
CCCC (town, myeon, dong)  00 (reserved)

1111000000 Seoul     Jongno-gu
1111051000 Seoul     Jongno-gu    Cheongun-dong
1111052000 Seoul     Jongno-gu    Hyoja-dong
1111053000 Seoul     Jongno-gu    Sajik-dong
1111054000 Seoul     Jongno-gu    Samcheong-dong
... omitted ...
4971032000 Jeju-Do   Bukjeju-gun  Chuja-myeon
4971033000 Jeju-Do   Bukjeju-gun  Udo-myeon
4972000000 Jeju-Do   Namjeju-gun
4972025000 Jeju-Do   Namjeju-gun  Daejeong-eup
4972025300 Jeju-Do   Namjeju-gun  Namwon-eup
4972025900 Jeju-Do   Namjeju-gun  Seongsan-eup
4972031000 Jeju-Do   Namjeju-gun  Andeok-myeon
4972032000 Jeju-Do   Namjeju-gun  Pyoseon-myeon

FIG. 4

| source type | Code value |
|---|---|
| Terrestrial Broadcast | 001 |
| Cable Broadcast | 002 |
| Satellite Broadcast | 003 |
| Private Broadcast | 004 |
| Educational Institution | 005 |
| ... | ... |
| others | 999 |

FIG. 5

| Genre | Code value |
|---|---|
| Sports | 001 |
| Movie | 002 |
| News | 003 |
| Drama | 004 |
| Documentary | 005 |
| ... | ... |
| others | 999 |

FIG. 6

| Video Resolution | Code value |
|---|---|
| 1920 * 1080 P | 001 |
| 1366 * 768 | 002 |
| 1280 * 800 | 003 |
| ... | ... |
| 640 * 480 | 099 |

| Audio Quality | Code value |
|---|---|
| AC3 Dolby 5.1 channel | 001 |
| MPEG surround audio channel | 002 |
| MP3 Stereo | 003 |
| ... | ... |
| MONO | 099 |

| Data Broadcasting | Code value |
|---|---|
| No data (A/V only) | 001 |
| ACAP data including | 002 |
| OCAP data including | 003 |
| ... | ... |
| Data only service | 009 |

FIG. 7

| cost level | Code value |
|---|---|
| Free Channels | 001 |
| Basic channels | 002 |
| Middle class channel | 003 |
| Premium light channel | 004 |
| High premium channel | 005 |
| ... | ... |
| others | 999 |

FIG. 12

| Element/Attribute Name | | | | Element/Attribute Description | Mandated/ Optional/ Conditional |
|---|---|---|---|---|---|
| ServiceDiscovery Type | | | | /ServiceDiscovery | |
| @Version | | | | Version of this record. A change in this value indicates a change in one of the ServiceProviderDiscovery Records | O |
| LogicalEntryNumber | | | | The logical provider number of entry point This could means the logical number of network provider | O |
| | ServiceProvicer type (one entry per service provider) | | | /ServiceDiscovery/ServiceProviderDiscovery/ServiceProvider | |
| | @DomainName | | | An internet DNS domain name registered by the Service Provider that uniquely identifies the Service Provider | M |
| | @Version | | | Version of the Service Provider(s) Discovery record; the version number shall be incremented every time a change in any of the records that comprise the service discovery information for this Service Provider occurs | M |
| | @LogoURI | | | Pointer to a Service Provider logo for potential display The pointer shall be a URI [21] | O |
| | | Name | | Name of the Service Provider for display in one or more languages; One Service Provider name is allowed per language code, and at least one language shall be provided (though not necessarily more than one) | M |
| | | Description | | Description of the Service Provider for potential display in one or more languages; one description is allowed per language code | O |
| | | OfferingListType type (one entry per offering) | | /ServiceDiscovery/ServiceProviderDiscovery/ ServiceProvider/Offering | |
| | | | Push@source Push@Address Push@Port | Port number and IP address of the multicast location of the DVB IP Offering Records which describe the offerings that the Service Provider makes available. This element is optional | O M M |
| | | | Pull@Location | This URI [21] encodes the location of the DVB IP Offering(s) Records which describe the offerings that the Service Provider makes available | O |
| | | | PayloadList Type(one entry per payload ID) | /ServiceDiscovery/ServiceProviderDiscovery/ServiceProvider/ Offering/Pull/PayloadId / ServiceDiscovery/ServiceProviderDiscovery/ServiceProvider/ Offering/Push/PayloadId | |
| | | | PayloadId@Id | Indicates the type of service discovery information available at the DVB-IP offering location. For example, this can be of type broadcast discovery of CoD discovery. The different values of this field are set out in table 1 in clause 5.2.2.1 | O |
| | | | Segment@ID | Indicates which segment carries service discovery information of type PayloadId@Id for this service provider | C see note |
| | | | Segment@Version | Version number of the segment identified by Segment@ID | O |
| LogicalSPNumber | | | | The logical number of service provider | O |

FIG. 13

```xml
<?xml version="1.0" encoding="UTF-8"?>
<ServiceDiscovery xmlns="urn:dvb:ipisdns:20063" xmlns:xsi="http://www.w3.org/2001/XMLSchema-instance"
xsi:schemaLocation="urn:dvb:ipisdns:2003 ipisdns-p1-v1-0-0.xsd" >
<LogicalEntryNumber>1</LogicalEntryNumber>
<ServiceProviderDiscovery>
<ServiceProvider DomainName="provider1.com" LogoURI="0" Version="0">
        <Name Language="ENG">Provider1</Name>
        <Description Language="ENG">Provider1 ADSL TV Offer</Description>
        <LogicalSPNumber>1</LogicalSPNumber>
        <Offering>
        <Push Address="224.1.1.5" Port="1234" Source="192.100.100.70">
        <PayloadId Id="5">
                        <Segment ID="0" Version="0"/>
        </PayloadId>
        </Push>
        <Push Address="224.1.1.2" Port="1234" Source="192.100.100.70">
        <PayloadId Id="2">
                        <Segment ID="0" Version="0"/>
        </PayloadId>
        </Push>
        </Offering>
</ServiceProvider>

<ServiceProvider DomainName="provider2.com" LogoURI="0" Version="0">
        <Name Language="ENG">Provider2</Name>
        <Description Language="ENG">Provider2 ADSL TV Offer</Description>
        <LogicalSPNumber>2</LogicalSPNumber>
        <Offering>
        <Push Address="224.1.1.6" Port="1234" Source="192.100.100.75">
        <PayloadId Id="5">
                        <Segment ID="0" Version="0"/>
        </PayloadId>
        </Push>
        <Push Address="224.1.1.3" Port="1234" Source="192.100.100.75">
        <PayloadId Id="2">
                        <Segment ID="0" Version="0"/>
        </PayloadId>
        </Push>
        </Offering>
</ServiceProvider>
</ServiceProviderDiscovery>
</ServiceDiscovery>
```

FIG. 14

| Element/Attribute Name | Element/Attribute Description | Mandated/ Optional |
|---|---|---|
| BroadcastOffering type: | /BroadcastDiscovery | |
| IPServiceList type (one per service list): | /BroadcastDiscovery/ServiceList | |
| ServicesDescriptionLocation | If present, this shall contain the identifier(s) of the BCG Record(s) for the BCG Discovery element that carries the information on this offering | O |
| @preferred | If present, specifies that this location contains the preferred BCG The default value for this attribute is false There shall be only one preferred BCG | O |
| IPService type (one entry per service) | /BroadcastDiscovery/Servicelist/SingleService | |
| SourceType (one entry per service) | Identifies the source type of this particular service such as terrestrial, satellite, cable and so on | O |
| LogicalChannelNumber | The logical channel number of each service | O |
| RegionNumber | Identifies the region of origin of service | O |
| TextualIdentitier@DomainName | An internet DNS domain name registered by the Service Provider that uniquely identifies the Service Provider. If this is not present, then the DNS domain name from the DVB IP Offering record is used | O |
| TextualIdentitier@ServiceName | An unique host name for the service within the service provider's domain | M |
| DVBTriplet@OrigNetId | Identifies the network Id of the originating delivery system | M |
| DVBTriplet@TSId | Identifies the Transport Stream | M |
| DVBTriplet@ServiceId | Identifies a service from any other service within the TS. The service Id is the same as the program number in the corresponding program map table | M |
| MaxBitrate | Specifies the maximum bitrate of the overall stream carrying the service | O |
| ServiceLocation type (one entry per service location) | /BroadcastDiscovery/ServiceList/SingleService/ServiceLocation | |
| IPMulticastAddress@Source IPMulticastAddress@Address IPMulticastAddress@Port | Signals the use of IGMP to access the service and provides the URL and port at which the service may be accessed. Optionally the IP unicast address of the source of the TS may be provided. At least one of IP MulticastAddress or RTSPURL must be present | O M(see note) M(see note) |
| RTSPURL | Signals the use of RTSP to access the service and provides the URL at which the service may be accessed. At least one of IPMulticastAddress or RTSPURL must be present | O |
| AudioAttributes | Signals details of the audio coding algorithms and purpose that the service may use. This shall take the from of the AudioAttributtes element defined in clause 6.3.5 of 102 822-3-1 v1.3.1 [71] and used in 102 323 [70]. The classification scheme used for the Coding element shall either be defined by 102 323 [70], or provided by this standard. If this element is omitted, then the default value of MPEG-1 or MPEG-2 layer 2 backwards compatible, mono or stereo and shall be the "normal" audio; Specifically this shall be the legacy value from TR 101 154 [68] | O |
| VideoAttributes | Signals details of the video coding that may be used by the service. This shall take the from of the VideoAttributtes element defined in clause 6.3.5 of 102 822-3-1 v1.3.1 [71] and used in 102 323 [70]. The classification scheme used for the Coding element shall either be defined by 102 323 [70], or provided by this standard. If this element is omitted, then the default value of MPEG-2 coded video, operating at MP@ML at a frame rate of 25Hz shall be used; specifically this shall be the legacy value from TR 101 154 [68] | O |
| NOTE: The Mandatory here means that if the Optional parent element is transmitted, then this field shall be present | | |

METHOD OF PROCESSING CHANNEL INFORMATION AND RECEIVER

This application claims the benefit of the Korean Patent Application Nos. 10-2007-0054906, filed on Jun. 5, 2007, 10-2007-0054907, filed on Jun. 5, 2007, 10-2007-0054908, filed on Jun. 5, 2007 which is hereby incorporated by reference as if fully set forth herein. Also, this application also claims the benefit of U.S. Provisional Application No. 60/879,046, filed on Jan. 8, 2007, which is hereby incorporated by reference.

BACKGROUND OF THE INVENTION

1. Field of the Invention

The present invention relates to a method of processing channel information, and a receiver, and more particularly, to a method and receiver capable of distinguishing various content channels from one another.

2. Discussion of the Related Art

Existing television (TV) services have been provided in such a manner that contents produced by broadcasting stations are transmitted through radio transmission media, such as terrestrial, cable or satellite broadcasting, and the user watches the transmitted contents through a TV receiver capable of receiving the transmitted contents via the respective transmission media.

However, as digital TV technologies based on digital broadcasting are developed and are commercially available, breaking from existing analog broadcasting, various types of content services, such as real-time broadcasts, Contents on Demand (CoD), games and news, can be provided to the user using an Internet network connected to each home, besides the existing transmission media.

An Internet Protocol TV (IPTV) may be taken as an example of the provision of content services using the Internet network. The IPTV refers to a service that transmits and provides various information services, moving image contents, broadcast contents, etc. to the user's TV using a very high-speed Internet network.

This IPTV is different from general terrestrial broadcasting or satellite broadcasting in that bidirectionality is additionally provided and the user can watch a desired content service at his/her convenient time.

However, in the case where an existing channel number management system is applied to the IPTV as it is, there is a problem that characteristics based on the Internet network are not reflected and it is difficult to make a distinction among various types of content services provided over the Internet network.

SUMMARY OF THE INVENTION

Accordingly, the present invention is directed to a method of processing channel information, and a receiver that substantially obviate one or more problems due to limitations and disadvantages of the related art.

An object of the present invention is to provide a method of processing channel information, and a receiver that can distinguish various content channels from one another.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a channel information processing method of a receiver includes receiving at least two of provider identification information, region identification information, content source identification information, content genre identification information, content data characteristic identification information, channel level identification information and content existing channel number identification information; forming multi-part channel information using the received identification information according to a preset channel information format; and connecting to a content service server of a channel corresponding to the multi-part channel information.

In another aspect of the present invention, a channel information processing method of a receiver includes parsing a packet including at least one of content information and provider information to extract the information included in the packet; storing the extracted content information and provider information, and creating and managing a channel map using the stored information; receiving a plurality of channel identification information and forming multi-part channel information using the received channel identification information; and connecting to a content service server of a channel corresponding to the multi-part channel information using the channel map.

In another aspect of the present invention, a channel information processing method of a receiver includes receiving service provider discovery information including service provider identification information; receiving service discovery information including content provider identification information and content service identification information; and storing the identification information included in the service provider discovery information and the identification information included in the service discovery information and creating a channel map using the stored information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a view showing an example of use of provider identification information as a part of channel information, according to one embodiment of the present invention;

FIG. 2 is a view showing an example of use of region identification information as a part of channel information, according to one embodiment of the present invention;

FIG. 3 is a view showing a region code table about region identification information according to one embodiment of the present invention;

FIG. 4 is a view showing an example of use of content source identification information as a part of channel information, according to one embodiment of the present invention;

FIG. 5 is a view showing an example of use of content genre identification information as a part of channel information, according to one embodiment of the present invention;

FIG. 6 is a view showing an example of use of content data characteristic identification information as a part of channel information, according to one embodiment of the present invention;

FIG. 7 is a view showing an example of use of channel level identification information as a part of channel information, according to one embodiment of the present invention;

FIG. 12 is a view showing a record including information of a service provider according to one embodiment of the present invention;

FIG. 13 is a view showing an implementation example of the record shown in FIG. 12 according to one embodiment of the present invention;

FIG. 14 is a view showing a record including content information according to one embodiment of the present invention;

DESCRIPTION OF SPECIFIC EMBODIMENTS

Figure 8:
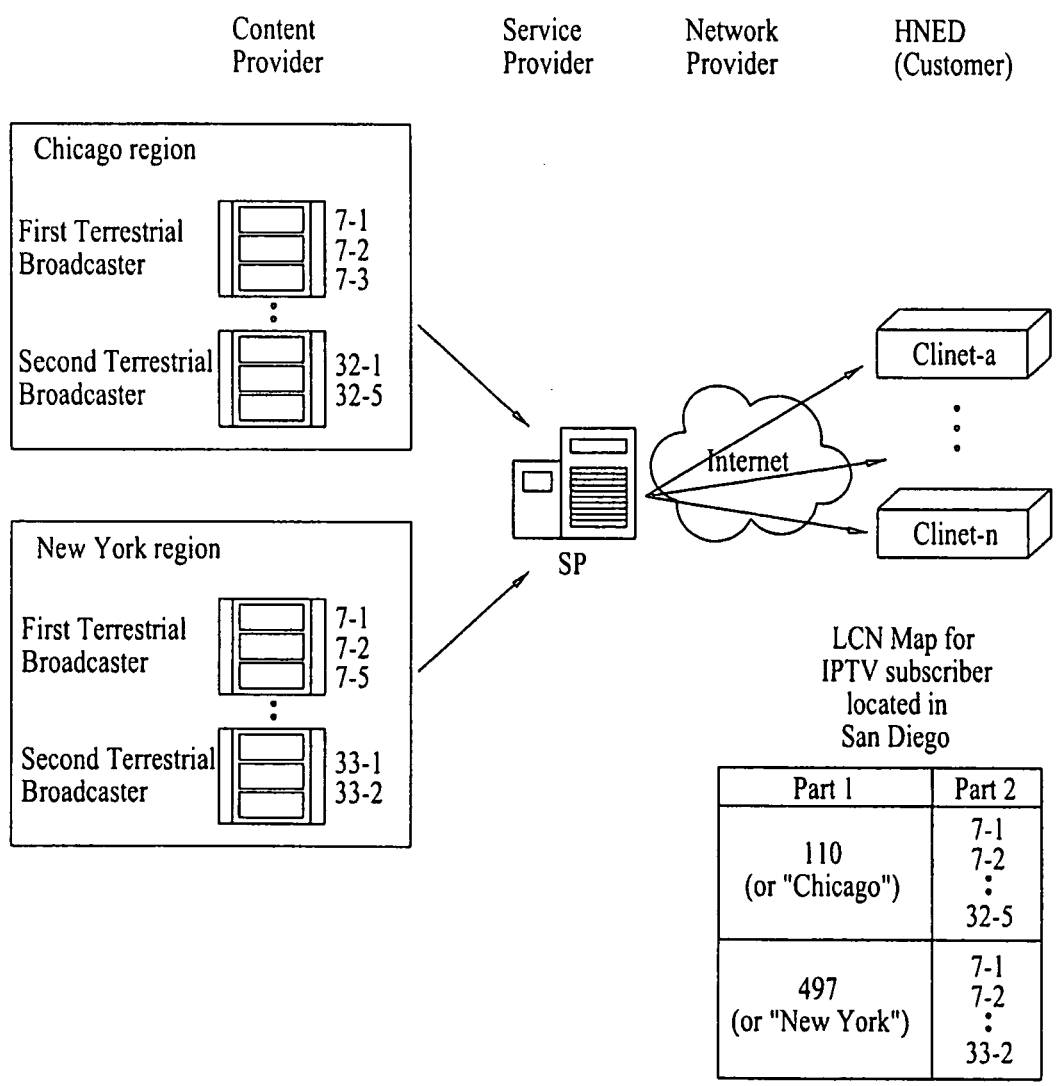
FIG. 8 is a view showing an example of use of region identification information as a part of multi-part channel information, according to one embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. In the following description of the present invention, a detailed description of known functions and configurations incorporated herein will be omitted when it may make the subject matter of the invention rather unclear.

Besides, although terms used in the present invention are possibly selected from the currently well-known ones, some terms are arbitrarily chosen by the inventor in some cases so that their meanings are explained in detail in the following description. Hence, the present invention should be understood with the intended meanings of the corresponding terms chosen by the inventor instead of the simple names or meanings of the terms themselves.

The operations of a method of processing channel information, method of receiving broadcast contents, and receiver according to the present invention will hereinafter be described in detail with reference to the accompanying drawings.

An Internet Protocol TV (IPTV) system, which is an example of a system capable of providing various contents using the Internet, can be broadly divided into a server, a network, and a receiver.

The server of the IPTV system includes servers taking charge of various functions, such as a service discovery & selection information server, a streaming server, a contents guide information server, a customer information server and a payment information server.

The streaming server, among these servers, transmits Moving Picture Experts Group (MPEG)2 or MPEG4-encoded moving image data stored therein to the user over the network. A Real-Time Transport Protocol (RTP: RFC1889), RTP Control Protocol (RTCP: RFC3605), Real-Time Streaming Protocol (RTSP: RFC2326), etc. may be used as protocols for the transmission.

Using the RTSP, the streaming server may control playback of a moving image stream to some degree through a function called Network Trick Play, including Pause, Replay, Stop, etc.

The contents guide information server is a server that provides information about various contents. The contents guide information corresponds to Electronic Program Guide (EPG) information and includes various information about contents. The contents guide information server stores contents guide information data and provides the stored data to the receiver.

The service discovery & selection information server provides the receiver with connection information, playback information, etc. about servers providing various content services such as broadcasting, Contents On Demand (COD) and games.

The network of the IPTV system includes an Internet-based network, and gateways. The gateways can perform multicast group management using an Internet Group Management Protocol (IGMP), etc., Quality of Service (QoS) management and so forth, as well as general data transfer.

The receiver of the IPTV system refers to a receiver capable of receiving data transmitted over the Internet network and providing the received data to the user. The receiver may be, for example, an IPTV settop, homenet gateway, or IPTV-embedded TV.

In the case where the IPTV system is of a hybrid type, it can provide various contents of the Internet, as well as various existing broadcast contents. That is, the IPTV system can provide the user with various broadcast contents, such as a terrestrial broadcast, cable broadcast, satellite broadcast and private broadcast, or various Internet image contents and data contents, etc. These contents may be provided in real time or on demand.

When the types of contents that can be provided as stated above become more various, it is difficult to distinguish various content channels from one another with only an existing number system, and the user may feel difficulty in selecting the content channels.

Therefore, differently from an existing channel information system that identifies each channel using a single number or distinguishes channels from one another using major channel numbers and minor channel numbers of each major channel number, a feature of the present invention is to readily distinguish various content channels from one another using a channel information system including a plurality of parts.

Each part is a channel information distinction unit, and may include a number or a text corresponding to the number. Hereinafter, the channel information composed of a plurality of parts will be referred to as multi-part channel information.

In the multi-part channel information system, the number, attributes, order, etc. of parts may be implemented in various ways in consideration of easiness of channel distinction, the user's convenience, characteristics of contents provided, etc. For example, the number of parts may be 2 or more. Also, one or more new parts may be additionally provided under the condition that an existing number system is used for compatibility with existing broadcasting systems. Hereinafter, a detailed example of the multi-part channel information will be described.

FIG. 1 shows an example of use of provider identification information as a part of channel information, according to one embodiment of the present invention.

In terms of provision of a content service, the IPTV system can be divided into a content provider (CP), service provider (SP), network provider (NP), and customer or user. The content provider creates and provides various contents, and the service provider packages the various contents provided from the content provider into a service and provides the packaged service. The network provider provides a network for provision of the packaged service to the user. The user can construct a Home Network End User (HNED) to receive the service.

In the embodiment of FIG. 1, channels of various contents can be distinguished from one another using respective provider identification information as one or more parts. That is, in the multi-part channel information, parts can be classified according to information about the types of the providers and channels can be distinguished from one another according to the classified parts. For example, in the case where content provider identification information is set as one part, channels of contents can be distinguished from one another according to the types of content providers. Similarly, in the case where service provider identification information or network provider identification information is set as one part, channels of contents can be distinguished from one another according to the types of service providers or network providers.

In the example of FIG. 1, a code identifying each content provider (CP) is 0 to 999, and a code identifying each service provider (SP) is 0 to 99. Also, a code identifying each network provider (NP) is 0 to 99, and a sequential number for channel identification at the user side is 0 to 999. It is possible to identify the same number of providers of each unit as that of identification numbers of each unit. When the number of providers of each unit increases, the number of identification numbers of each unit can increase. Thus, the number of identification numbers is nothing but one example, and the spirit of the present invention is not limited thereto.

In this manner, the present invention can implement the multi-part channel information using the provider identification information. For example, in the case of distinguishing content channels from one another using all the information about the providers of the three types, it is possible to implement 4-part channel information. When the 4-part channel information is implemented, the channel information system has a format such as 'content provider'-'service provider'-'network provider'-'sequential number'.

Assume that the code of 'MBC' which is one of the content providers is 100, the code of 'HanaTV' which is one of the service providers is 2, and the code of 'DACOM' which is one of the network providers is 1. In order to watch a broadcast content of the MBC which is provided from the HanaTV using a DACOM network, the user can input '100-2-1-xxx'. When the sequential number at the user side for broadcast contents provided from the MBC is 003, the user can input '100-2-1-003' to watch the desired content. An existing broadcast channel number or the like may be used as the sequential number. Also, the multi-part channel information, such as '100-2-1-003', may be displayed on a portion of the screen when the corresponding content is displayed.

For the respective parts, texts corresponding to the code values may be used instead of the code values, and a combination of the code values and texts may also be used. For example, the 4-part channel information may have a format of 'MBC-HanaTV-DACOM-003' or ' MBC-2-1-003'.

The multi-part channel information using the information of the respective providers is nothing but one example, and the order of the parts may be different or some of the parts may be omitted, according to different embodiments. For example, the multi-part channel information may have a 3-part format such as 'service provider'-'content provider'-'sequential number'. In this case, the broadcast content of the MBC provided from the HanaTV can be selected or displayed by a format such as '2-100-003' or '2-MBC-003'.

Alternatively, one or more provider identification information and other types of information may be together used to implement the multi-part channel information. For example, an existing channel number and the provider identification information may be together used to implement the multi-part channel information. The existing channel number is an identification number used by each content provider, and may be a single number or a number consisting of a major channel number and a minor channel number.

For example, assume that 'KBS', which is a broadcaster providing a terrestrial broadcast over a '11-1 (major channel-minor channel)' channel, provides a broadcast content to the IPTV user through 'HanaTV', which is an IPTV service provider. In the case where the user uses multi-part channel information of a 2-part format such as 'service provider'-'existing channel number', he/she can watch the broadcast content of the KBS provided from the HanaTV by inputting '2-11-1'. For each part, a text corresponding to the code value may be used instead of the code value.

In each of the above examples, the types, number and order of parts are nothing but examples, and the number of parts may increase or reduce and the types of parts may be changed, according to different embodiments.

The code values about each content provider, service provider and network provider and about the sequential number at the user side must be predefined in the receiver. These values may be received and stored together with information about each provider when the information about each provider is received by the receiver.

FIG. 2 shows an example of use of region identification information as a part of channel information, according to one embodiment of the present invention. In the embodiment of FIG. 2, content channels can be distinguished from one another using content provision region code information, service provision region code information, network provision region code information and user region code information as one or more parts.

For example, in the case where content provision region identification information is set as one part, channels of contents can be distinguished from one another according to regions where the contents are provided. Similarly, in the case where service provision region identification information or network provision region identification information is set as one part, channels of contents can be distinguished from one another according to regions where the service or network is provided.

FIG. 3 shows a region code table about region identification information according to one embodiment of the present invention. The region code table may be, for example, an administrative computer network region code table that represents respective region codes of Korea. The region codes distinguishing regions from one another have an 'AABBCCCC00' format, in which 'AA' represents information of a city or province unit, 'BB' represents information of a city, county or district unit, and 'CCCC' represents information of a town, myeon or dong unit. This region code system may be different according to countries, and the above example is nothing but one embodiment. The region code table as stated above may be prestored in the receiver, or be downloaded and stored in the receiver by the user.

The region identification information and region codes as stated above can be used to implement multi-part channel information. For example, all the four types of region identification information may be used to implement 4-part channel information such as 'content provision region'-'service provision region'-'network provision region'-'user region'. Alternatively, the region identification information may be used as one or more parts to implement multi-part channel information.

For example, assume that two region identification information, 'content provision region'-'service provision region', are used to implement 2-part channel information. Provided that an IPTV service provider in Jongno-gu Seoul provides a broadcast content provided in Seongsan-eup Namjeju-gun to the user, the user can watch the content provided in Seongsan-eup Namjeju-gun by inputting '4972025900-1111000000'. Here, '4972025900' is the region code of Seongsan-eup Namjeju-gun, and '1111000000' is the region code of Jongno-gu Seoul.

For the respective parts, texts corresponding to the code values may be used instead of the code values, and a combination of the code values and texts may also be used. For example, in the example of the 2-part channel information, a format of 'Seongsan-eup Namjeju-gun-1111000000' or '4972025900-Jongno-gu Seoul' may be used.

The multi-part channel information using the respective region identification information is nothing but one example, and the order of the parts may be different or some of the parts may be omitted, according to different embodiments. Alternatively, the region identification information and other types of information may be together used to implement the multi-part channel information.

Next, assume that the service provider identification information described in FIG. 1 and the region identification information described in FIG. 2 and FIG. 3 are used together. If the content provision region identification information and the service provider identification information are used to implement 2-part channel information and the user wants to watch a content provided in Seongsan-eup Namjeju-gun among contents provided from 'HanaTV', the user can watch the desired content by inputting '4972025900-2'. Here, '4972025900' is the region code of Seongsan-eup Namjeju-gun, and the next '2' is identification information assigned to the 'HanaTV', which is a service provider.

Similarly, for the respective parts, texts corresponding to the code values may be used instead of the code values.

Alternatively, an existing channel number and the region identification information may be together used to implement multi-part channel information.

For example, assume that 'KBS', which is a broadcaster providing a terrestrial broadcast, provides a terrestrial broadcast content over a '11-1 (major channel-minor channel)' channel in Seongsan-eup Namjeju-gun and also provides a terrestrial broadcast content over the '11-1' channel in Jongno-gu Seoul. The channel number '11-1' is an existing channel number in each region to which the terrestrial broadcast of the KBS is applied.

If it is assumed that the 'HanaTV', which is an IPTV service provider, provides both the KBS broadcast contents of the above regions, the user can make a channel distinction using multi-part channel information of a 3-part format such as 'service provider'-'content provision region'-'existing channel number'.

That is, when the service provider code value of the HanaTV is 2, the user can watch the KBS broadcast provided in Seongsan-eup Namjeju-gun through the HanaTV service by inputting '2-4972025900-11-1'. If the user inputs '2-1111000000-11-1', he/she can watch the KBS broadcast provided in Jongno-gu Seoul through the HanaTV service.

In the case where the region identification information is used to implement multi-part channel information, the code values about each content provision region, each service provision region of each service provider, each network provision region of each network provider and each user region must be predefined in the receiver. Upon receiving information about each provider, the receiver receives the information together with a code value about each region, and uses the received information and code values to distinguish channels of contents from one another. The receiver may compare the received code values with the values of the region code table as shown in FIG. 3 to express each part in text and make a channel distinction.

FIG. 4 shows an example of use of content source identification information as a part of channel information, according to one embodiment of the present invention. Contents provided through the IPTV service may be provided from various types of sources. For example, various broadcast contents, such as a terrestrial broadcast, cable broadcast, satellite broadcast and private broadcast, or various Internet image contents and data contents, etc. on the Internet may be provided.

In the embodiment of FIG. 4, channels of various contents can be distinguished from one another using source identification information of the respective contents as one or more parts. That is, in multi-part channel information, channels can be distinguished from one another according to the source types of the contents.

In the example of FIG. 4, a terrestrial broadcast content has a code value of 001, a cable broadcast content has a code value of 002, a satellite broadcast content has a code value of 003, a private broadcast content has a code value of 004, an educational institution broadcast content has a code value of 005, and other contents have a code value of 999. It is possible to identify the same number of source types as that of code values. When the number of source types increases, the number of code values can increase and the order thereof may also be changed. Thus, the number of code values is nothing but one example, and the spirit of the present invention is not limited thereto.

Multi-part channel information can be implemented using the content source identification information as one or more parts. For example, the content source identification information and an existing channel number may be used to implement multi-part channel information.

Assume that 'KBS', which is a broadcaster providing a terrestrial broadcast, provides a terrestrial broadcast content over a '11-1 (major channel-minor channel)' channel, 'Kangnam Cable Broadcast', which is a cable broadcasting company, provides cable broadcast contents over three channels of numbers '4', '5' and '6', and 'Skylife', which is a satellite broadcasting company, provides satellite broadcast contents over four channels of numbers '1', '5', '6' and '10'. Here, the channel numbers are existing channel numbers that the respective broadcasting companies use.

Hence, the user can make a channel distinction according to sources using multi-part channel information of a 2-part format such as 'content source'-'existing channel number'. If it is assumed that each content source has a code value as shown in FIG. 4, the user can watch the terrestrial broadcast, the KBS broadcast, by inputting '001-11-1'. Also, the user can watch the cable broadcast, the channel 5 of the Kangnam Cable Broadcast, by inputting '002-5', and the satellite broadcast, the channel 5 of the Skylife by inputting '003-5'.

If the source code value of Internet image contents is defined as '006', the user can watch a desired content by inputting a 2-part format such as '006-IP address or channel number'. That is, the user can watch a desired Internet image content by personally inputting an IP address at which the desired Internet image content is stored or inputting a channel number defined correspondingly to the IP address.

Here, the number, order, types, etc. of parts are nothing but examples and may be different according to different embodiments. For example, assume that 'HanaTV', which is an IPTV service provider, packages the terrestrial broadcast, cable broadcast, satellite broadcast and Internet image content taken as the above examples into a service and provides the packaged service to the user. In order to select and watch one of the contents provided by the HanaTV among various service providers, the user can use channel information of a 3-part format with a service provider identification information indicating part added.

That is, channel information of a format such as 'service provider'-'content source'-'existing channel number' can be used. Assuming that the service provider code value of the HanaTV is 2, the user can watch the terrestrial broadcast, the channel 11-1 of the KBS, provided from the HanaTV by inputting '2-001-11-1', and the cable broadcast, the channel 5 of the Kangnam Cable Broadcast, provided from the HanaTV by inputting '2-002-5'.

In the case where the source code value of the Internet image content is defined as '006', the user can watch the Internet image content provided from the HanaTV by inputting channel information such as '2-006-IP address or channel number'. In this case, the user can watch the desired Internet image content by personally inputting an IP address at which the desired Internet image content is stored or inputting a channel number defined correspondingly to the IP address.

Similarly, in each of the above examples, for the respective parts, texts corresponding to the code values may be used instead of the code values.

The code values about the respective content sources must be predefined in the receiver. These values may be received and stored together with information about content providers or service providers when the information is received by the receiver.

FIG. 5 shows an example of use of content genre identification information as a part of channel information, according to one embodiment of the present invention. Contents of various genres can be provided through the IPTV service. Therefore, multi-part channel information can be implemented by distinguishing channels from one another according to the genres of the contents provided.

In the embodiment of FIG. 5, channels of various contents can be distinguished from one another using genre identification information of the respective contents as one or more parts. That is, in multi-part channel information, channels can be distinguished from one another according to the genres of the contents.

In the example of FIG. 5, a content of a sports genre has a code value of 001, a content of a movie genre has a code value of 002, a content of a news genre has a code value of 003, a content of a drama genre has a code value of 004, a content of a documentary genre has a code value of 005, and contents of other genres have a code value of 999. It is possible to identify the same number of content genres as that of code values. When the number of content genres increases, the number of code values can increase and the order thereof may also be changed. Thus, the number of code values is nothing but one example, and the spirit of the present invention is not limited thereto.

The content genre identification information can be used as one or more parts to implement multi-part channel information to manage and watch channels according to content genres. For example, the content genre identification information and an existing channel number may be used to implement multi-part channel information.

Assume that 'KBS', which is a broadcaster providing a terrestrial broadcast, provides a sports broadcast content over a '11-2 (major channel-minor channel)' channel, and 'Kangnam Cable Broadcast', which is a cable broadcasting company, provides a sports broadcast content over a channel '5' and a movie content over a channel '6', respectively. Here, the channel numbers are existing channel numbers that the respective broadcasting companies use.

The user can make a channel distinction according to content genres using multi-part channel information of a 2-part format such as 'content genre'-'existing channel number'. If it is assumed that each content genre has a code value as shown in FIG. 5, the user can watch the terrestrial broadcast, the sports channel broadcast of the KBS, by inputting '001-11-2'. Also, the user can watch the sports channel broadcast of the Kangnam Cable Broadcast by inputting '001-5', and the movie channel broadcast of the Kangnam Cable Broadcast by inputting '002-6'.

Here, the number, order, types, etc. of parts are nothing but examples and may be different according to different embodiments. For example, assume that 'HanaTV', which is an IPTV service provider, packages the contents taken as the above examples into a service and provides the packaged service to the user. In order to select and watch one of the contents provided by the HanaTV among various service providers, the user can use channel information of a 3-part format with a service provider identification information indicating part added.

That is, channel information of a format such as 'service provider'-'content genre'-'existing channel number' can be used. Assuming that the service provider code value of the HanaTV is 2, the user can watch the terrestrial broadcast, the sports channel broadcast of the KBS, provided from the HanaTV by inputting '2-001-11-2', and the cable broadcast, the sports channel broadcast of the Kangnam Cable Broadcast, provided from the HanaTV by inputting '2-001-5'.

In the case where the content genres are used as two or more parts, it is possible to subdivide the content genres and make a channel distinction based on the subdivided content genres. For example, assume that 'KBS', which is a broadcaster providing a terrestrial broadcast, provides a sports news content over a '11-3 (major channel-minor channel)' channel and a sports movie content over a '11-4' channel, respectively, and 'Kangnam Cable Broadcast', which is a cable broadcasting company, provides a sports news content over a channel '4' and a sports documentary content over a channel '5', respectively. Here, the channel numbers are existing channel numbers that the respective broadcasting companies use.

By using multi-part channel information of a 3-part format such as 'content genre'-'detailed content genre'-'existing channel number', the user can subdivide the content genres and make a channel distinction based on the subdivided content genres. Assuming that each content genre has a code value as shown in FIG. 5, the user can watch the terrestrial broadcast, the sports news channel (11-3) broadcast of the KBS, by inputting '001-003-11-3'. Also, the user can watch the sports news channel (4) broadcast of the Kangnam Cable Broadcast by inputting '001-003-4', and the sports documentary channel (5) broadcast of the Kangnam Cable Broadcast by inputting '001-005-5'.

Here, the number, order, types, etc. of parts are nothing but examples and may be different according to different embodiments. For example, assume that 'HanaTV', which is an IPTV service provider, packages the contents taken as the above examples into a service and provides the packaged service to the user. In order to select and watch one of the contents provided by the HanaTV among various service providers, the user can use channel information of a 3-part format with a service provider identification information indicating part added, such as 'service provider'-'detailed content genre'-'existing channel number'.

Similarly, in each of the above examples, for the respective parts, texts corresponding to the code values may be used instead of the code values.

The code values about the respective content genres must be predefined in the receiver. These values may be received and stored together with information about content providers or service providers when the information is received by the receiver.

FIG. 6 shows an example of use of content data characteristic identification information as a part of channel information, according to one embodiment of the present invention. Data of contents provided through the IPTV service can have various formats. For example, various video formats, audio formats, data broadcasting formats, etc. may be used. Therefore, multi-part channel information can be implemented by distinguishing channels from one another according to the data characteristics of the contents provided. In this case, the user can manage and watch channels in consideration of the specifications of the receiver.

In the embodiment of FIG. 6, channels of various contents can be distinguished from one another using data characteristic identification information of the respective contents as one or more parts. That is, in multi-part channel information, channels can be distinguished from one another according to the data characteristics of the contents.

In the example of FIG. 6, content data is classified according to video formats, audio formats and data broadcasting formats. In the case of the video formats, content data of a '1920*1080p' format has a code value of 001, content data of a '1366*768' format has a code value of 002, content data of a '1280*800' format has a code value of 003, and content data of a '640*480' format has a code value of 099.

In the case of the audio formats, content data of an 'AC3 Dolby 5.1 channel' format has a code value of 001, content data of an 'MPEG surround audio channel' format has a code value of 002, content data of an 'MP3 stereo' format has a code value of 003, and content data of a 'MONO' format has a code value of 099.

In the case of the data broadcasting formats, content data having only audio/video data has a code value of 001, content data of an 'Advanced Common Application Platform (ACAP) data broadcasting' format has a code value of 002, content data of an 'OpenCable Application Platform (OCAP) data broadcasting' format has a code value of 003, and content data of a 'data only broadcasting' format has a code value of 009.

It is possible to identify the same number of content data characteristics as that of code values. When the number of format types increases, the number of code values can increase and the order thereof may also be changed. Thus, the number of code values is nothing but one example, and the spirit of the present invention is not limited thereto. Also, the audio, video and data broadcasting formats are examples of the content data characteristics, and the content data may be classified according to other characteristics.

The content data characteristic identification information can be used as one or more parts to implement multi-part channel information to manage and watch channels. For example, the content data characteristic identification information and an existing channel number may be used to implement multi-part channel information.

Assume that 'KBS', which is a broadcaster providing a terrestrial broadcast, provides a broadcast content of the 1920*1080p video format, AC3 Dolby 5.1 channel audio format and audio/video data only broadcasting format over a '11-1 (major channel-minor channel)' channel, and 'Kangnam Cable Broadcast', which is a cable broadcasting company, provides a broadcast content of the 1280*800 video format, MPEG surround audio channel audio format and audio/video data only broadcasting format over a channel '5'. Also, assume that the 'Kangnam Cable Broadcast' provides a broadcast content of the 1920*1080p video format, MPEG surround audio channel audio format and OCAP data broadcasting format over a channel '6'. Here, the channel numbers are existing channel numbers that the respective broadcasting companies use.

The user can make a channel distinction according to content data characteristics using multi-part channel information of a 2-part format such as 'content data characteristic'-'existing channel number'. The code values of the video formats, audio formats and data broadcasting formats can be used for the content data characteristics.

Assuming that each content data characteristic has a code value as shown in FIG. 6 and a channel distinction is made according to the video formats, the user can watch the terrestrial broadcast, the channel 11-1 broadcast content of the KBS, among contents of the 1920*1080p video format by inputting '001-11-1'. If the user inputs '001-6', he/she can watch the cable broadcast, the channel 6 broadcast content of the Kangnam Cable Broadcast, among contents of the 1920*1080p video format.

In the case where the channel distinction is made according to the audio formats, the user can watch the cable broadcast, the channel 5 broadcast content of the Kangnam Cable Broadcast, among contents of the MPEG surround audio channel audio format by inputting '002-5'. Also, the user can watch the channel 6 broadcast content of the Kangnam Cable Broadcast among contents of the MPEG surround audio channel audio format by inputting '002-6'.

Here, the number, order, types, etc. of parts are nothing but examples and may be different according to different embodiments. For example, assume that 'HanaTV', which is an IPTV service provider, packages the contents taken as the above examples into a service and provides the packaged service to the user. In order to select and watch one of the contents provided by the HanaTV among various service providers, the user can use channel information of a 3-part format with a service provider identification information indicating part added, such as 'service provider'-'content data characteristic'-'existing channel number'.

The content data characteristics may be used as two or more parts, like 'content data characteristic-'content data characteristic'-'existing channel number'. In this case, different types of characteristic code values are used for the respective content data characteristics.

similarly, in each of the above examples, for the respective parts, texts corresponding to the code values may be used instead of the code values.

The code values about the respective content data characteristics must be predefined in the receiver. These values may be received and stored together with information about content providers or service providers when the information is received by the receiver.

FIG. 7 shows an example of use of channel level identification information as a part of channel information, according to one embodiment of the present invention. Contents provided through the IPTV service can be provided to the user discriminately according to levels. For example, contents may be provided discriminately according to watching levels or watching cost levels of the contents. Therefore, multi-part channel information can be implemented by distinguishing contents and channels from one another according to the above levels. In this case, the user can manage and watch channels in consideration of the watching levels or watching cost levels.

In the embodiment of FIG. 7, various contents and channels can be distinguished from one another using watching cost level identification information as one or more parts. That is, in multi-part channel information, channels can be distinguished from one another according to the watching cost levels.

In the example of FIG. 7, a free channel has a code value of 001, a basic channel has a code value of 002, a middle class channel has a code value of 003, a premium light channel has a code value of 004, a high premium channel has a code value of 005, and other channels have a code value of 999. It is possible to identify the same number of levels as that of code values. The number of code values can increase or reduce and the order thereof may also be changed. Thus, the number of levels or the number of code values is nothing but one example, and the spirit of the present invention is not limited thereto.

The channel level identification information as stated above can be used as one or more parts to implement multi-part channel information. It is also possible to manage and watch channels using the implemented multi-part channel information. For example, the watching cost level identification information among the channel level identification information and an existing channel number may be used to implement multi-part channel information.

Assume that, among broadcast contents of channels '1' to '50' provided by 'Kangnam Cable Broadcast', which is a cable broadcasting company, the user can watch the channels '1' to '10' when paying no watching cost, the channels '1' to '20' when paying a basic watching cost, the channels '1' to '30' when paying a middle class watching cost, the channels '1' to '40' when paying a premium light class watching cost, and the channels '1' to '50' when paying a high premium class watching cost. Here, the channel numbers are existing channel numbers that the Kangnam Cable Broadcast uses for cable broadcasts.

The user can make a channel distinction according to channel levels using multi-part channel information of a 2-part format such as 'channel level'-'existing channel number'.

Assuming that each channel level has a code value as shown in FIG. 7, the user can watch the broadcast content of the channel 34 provided by the Kangnam Cable Broadcast by inputting '004-34' when he/she pays the premium light class watching cost. Also, the user can watch the broadcast content of the channel 11 by inputting '004-11'. The high premium class (code value 005) only channels (channels 41 to 50) may be excluded from the channel list.

Here, the number, order, types, etc. of parts are nothing but examples and may be different according to different embodiments. For example, assume that 'HanaTV', which is an IPTV service provider, packages the contents taken as the above examples into a service and provides the packaged service to the user. In order to select and watch one of the contents provided by the HanaTV among various service providers, the user can use channel information of a 3-part format with a service provider identification information indicating part added, such as 'service provider'-'channel level'-'existing channel number'.

Similarly, in each of the above examples, for the respective parts, texts corresponding to the code values may be used instead of the code values.

The code values about the respective channel levels must be predefined in the receiver. These values may be received and stored together with information about content providers or service providers when the information is received by the receiver.

The types of information usable in the respective parts in the multi-part channel information system have been described with reference to FIG. 1 to FIG. 7. As in the above-described examples, the respective information may be individually used to implement multi-part channel information or the respective information may be combined to implement multi-part channel information.

For example, in the case of using 3-part channel information such as 'content provision region'-'content source'-'existing channel number', the user can select and watch a content, such as a terrestrial, cable or satellite broadcast, provided in each region. In order to select and watch a content provided by a specific service provider among a plurality of IPTV service providers, the user can use 4-part channel information such as 'service provider'-'content provision region'-'content source'-'existing channel number'.

Here, the number, order, types, etc. of parts are nothing but examples and may be different according to different embodiments. That is, the order of the parts in the 4-part channel information taken as the above example may be changed like 'content provision region'-'service provider'-'content source'-'existing channel number' or 'content source'-'existing channel number'-'service provider'-'content provision region'. In addition, in the case where no content source identification information is used, 3-part channel information such as 'service provider'-'content provision region'-'existing channel number' may be implemented and used.

FIG. 8 shows an example of use of region identification information as a part of multi-part channel information, according to one embodiment of the present invention. The IPTV system can be divided into a content provider (CP), a service provider (SP), a network provider (NP), and a home network end user (HNED) or customer, in terms of the provision of content services.

The HNED or customer connects to the service provider via an IPTV receiver (or a client), to receive information about content providers. Using the information about content providers, the HNED or customer can connect to the server of a content provider providing a content desired by the HNED or customer, to watch the content.

In the example of FIG. 8, a first terrestrial broadcaster as one of content providers provides terrestrial broadcasts over channels '7-1 (major channel-minor channel)', '7-2' and '7-3' in a Chicago region, and provides terrestrial broadcasts over channels '7-1', '7-2' and '7-5' in a New York region. A second terrestrial broadcaster as another content provider provides terrestrial broadcasts over channels '32-1 (major channel-minor channel)' and '32-5' in the Chicago region, and provides terrestrial broadcasts over channels '33-1' and '33-2' in the New York region. Where the broadcasting regions of the first and second terrestrial broadcasters are different from each other, the first and second terrestrial broadcasters may transmit broadcasts, using the same channel number or different channel numbers.

The service provider packages the broadcast contents provided by the first and second terrestrial broadcasters into a service, and provides the packaged service to the HNED or customer over an Internet network. The network provider provides the Internet network for the above-described services.

When it is assumed that an HNED or customer, who resides in San Diego, desires to watch broadcast contents provided by the first terrestrial broadcaster, the service provider, who provides IPTV services to the HNED or customer, must provide both the broadcast contents of the first terrestrial broadcaster provided in the Chicago region and the broadcast contents of the first terrestrial broadcaster provided in the New York region. To this end, it is necessary to make a distinction between the broadcasts provided in the Chicago region and the broadcasts provided in the New York region at the side of the HNED or customer.

In the example of FIG. 8, this requirement can be satisfied, using code values about content provision regions as a part of multi-part channel information. For example, 2-part channel information such as 'content provision region'-'existing channel number' information may be used. The 'content provision region'-'existing channel number' information can be created, using information about the content provision region, together with the existing channel number.

For example, where the content provision region code value of Chicago is 110, and the content provision region code value of New York is 497, the HNED or customer can watch the content of the channel '7-2' selected from among the broadcast contents of the first terrestrial broadcaster provided in Chicago, by inputting a value of 110-7-2. When the HNED or customer inputs a value of 497-7-2, it is possible to watch the content of the channel '7-2' selected from among the broadcast contents of the first terrestrial broadcaster provided in New York.

The above-described 2-part channel information has been specified only for illustrative purposes. The order of the parts in the channel information may be changed. In addition, each part may be represented by a text, instead of a numeral value. For example, 2-part channel information having an order of 'existing channel number'-'content provision region' may be used. Also, channel information having a combination of a numeral and a text, may be created, using a text such as 'Chicago' or 'New York'. For example, channel information '7-2-Chicago' may be used.

Figure 9:
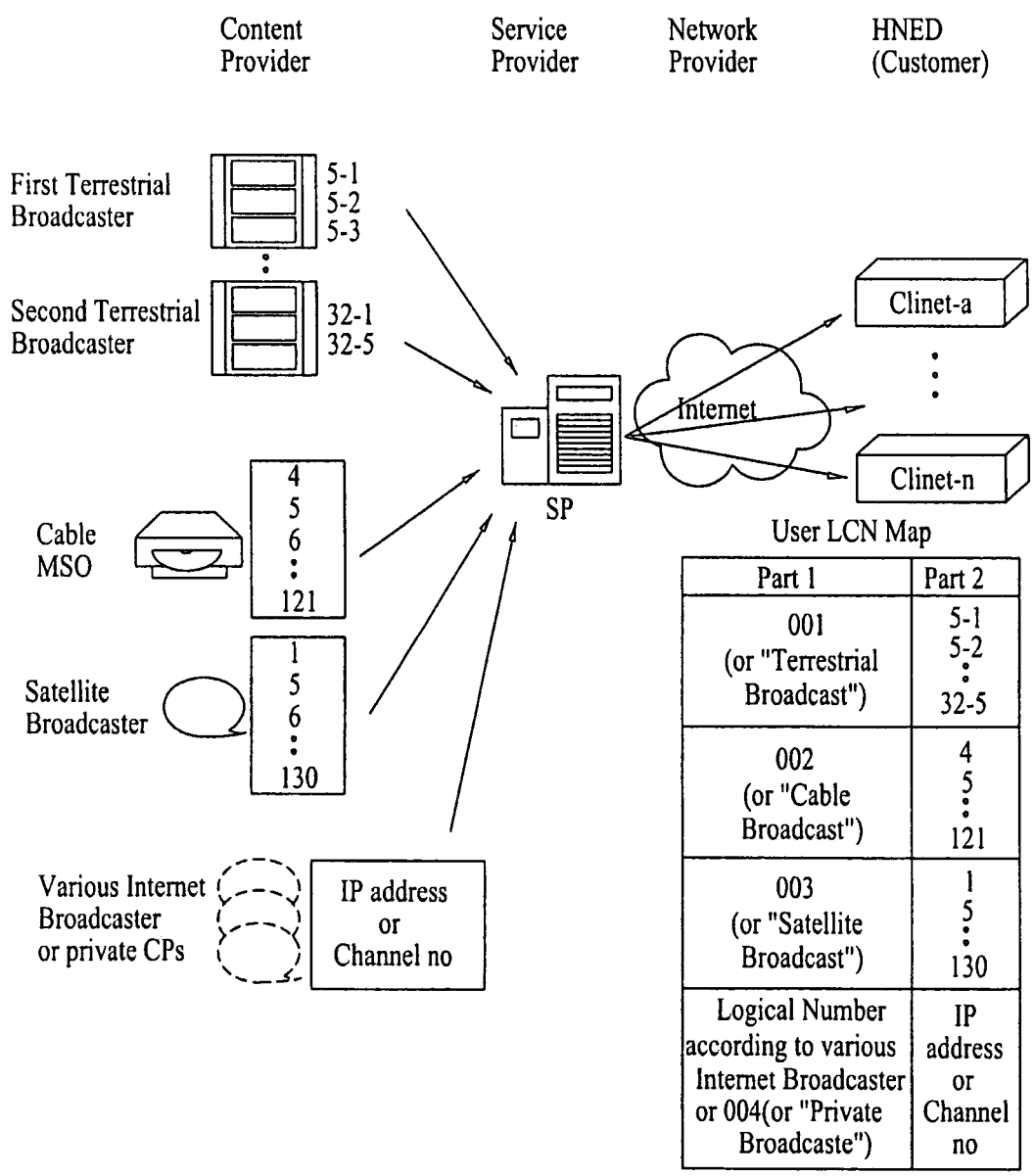
FIG. 9 is a view showing an example of use of content source identification information as a part of multi-part channel information, according to one embodiment of the present invention.

FIG. 9 shows an example of use of content source identification information as a part of multi-part channel information, according to one embodiment of the present invention. The content source identification information means information about the type of a content provider. There may be various types of content providers, for example, types of providers of terrestrial broadcast contents, cable broadcast contents, satellite broadcast contents, Internet broadcast contents, various image data contents, and data contents other than image data contents. In the example of FIG. 9, channels can be distinguished from one another in accordance with the above-described content sources.

In the example of FIG. 9, a first terrestrial broadcaster as one content provider provides terrestrial broadcasts over channels '5-1', '5-2', and '5-3'. On the other hand, a second terrestrial broadcaster as another content provider provides terrestrial broadcasts over channels '32-1' and '32-5'. A cable multiple system operator (MSO) as another content provider provides various cable broadcasts over channels '4', '5', '6', . . . , and '121'. A satellite broadcast provider provides various satellite broadcasts over channels '1', '5', '6', . . . , and '130'. Also, there may be various Internet broadcasters providing Internet broadcast contents other than the above-described broadcast contents, and private content providers providing contents such as Internet images.

The service provider packages the image contents, provided by the first and second terrestrial broadcasters, cable MSO, satellite broadcaster, various Internet broadcasters, and private content providers, etc., into a service, and provides the packaged service to the HNED or customer over an Internet network.

When it is assumed that an HNED or customer desires to watch broadcast contents provided by the first terrestrial broadcaster, from among the contents provided by the above-described various service providers, the service provider, who provides IPTV services to the HNED or customer, must provide all the broadcast contents provided by the first terrestrial broadcaster, second terrestrial broadcaster, cable MSO, satellite broadcast provider, various Internet broadcasters, and private content providers, etc. In this case, there may the same existing channel number for different content providers. To this end, it is necessary to make a distinction among the contents in terms of the content provider type.

In the example of FIG. 9, this requirement can be satisfied, using code values about content sources as a part of multi-part channel information. For example, 2-part channel information such as 'content source'-'existing channel number' information may be used. The 'content source'-'existing channel number' information can be created, using information about the content source, together with the existing channel number.

For example, it is assumed that a terrestrial broadcast content has a code value of 001, a cable broadcast content has a source code value of 002, a satellite broadcast content has a source code value of 003, and a private broadcast content has a source code value of 004.

In this case, when the HNED or customer inputs a value of 001-5-2, he/she can watch the content of the channel '5-2' selected from among the broadcast contents of the first terrestrial broadcaster. When the HNED or customer inputs a value of 002-5, it is possible to watch the content of the channel '5' selected from among the broadcast contents provided by the cable MSO. Upon inputting a value of 003-5, the HNED can watch the content of the channel '5' selected from among the broadcast contents provided by the satellite broadcaster.

For an Internet broadcast content or private content, a channel number may be used, if there is an existing channel number corresponding to the channel number. An IP address, at which the content is stored, may also be used. If there is no existing channel number, the IP address, at which the content is stored, may be input.

The above-described 2-part channel information has been specified only for illustrative purposes. The order of the parts in the channel information may be changed. In addition, each part may be represented by a text, instead of a numeral value. Alternatively, each part may be represented by a combination of a numeral and a text. For example, 2-part channel information having an order of 'existing channel number'-'content source' may be used. Also, channel information having a numeral-text combination may be created, using a text such as 'cable broadcast' for the content source part, instead of the corresponding source code value. For example, channel information '5-cable broadcast' may be used.

Figure 10:
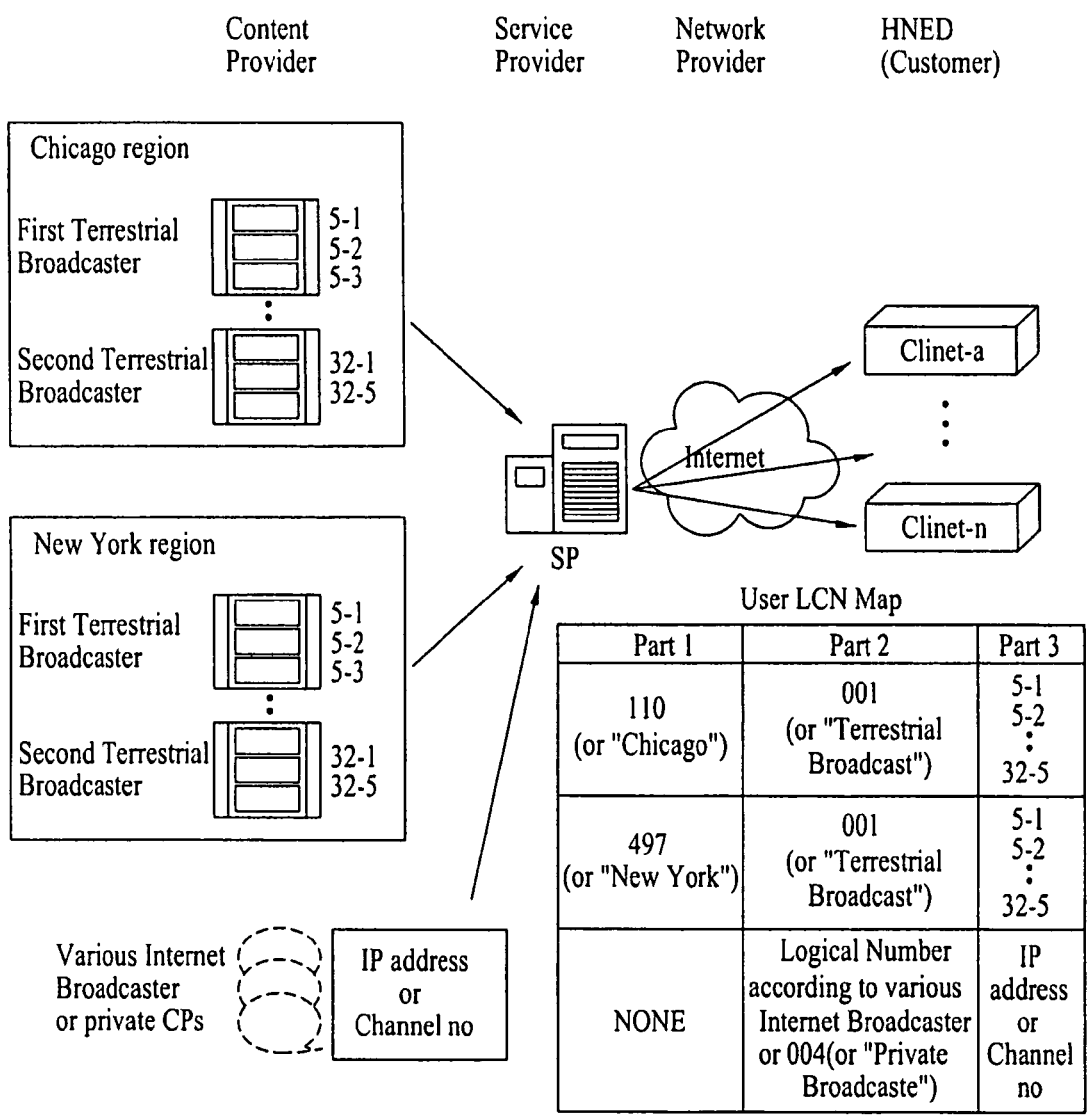
FIG. 10 is a view showing an example of use of region identification information and content source identification information as parts of multi-part channel information, according to one embodiment of the present invention.

FIG. 10 shows an example of use of region identification information and content source identification information as parts of multi-part channel information, according to one embodiment of the present invention. In the example of FIG. 10, multi-part channel information is implemented using both the region identification information and content source identification information.

In the example of FIG. 10, a first terrestrial broadcaster as one content provider provides terrestrial broadcasts over channels '5-1', '5-2', and '5-3' in a Chicago region, and also provides terrestrial broadcasts over the channels '5-1', '5-2' and '5-3' in a New York region. On the other hand, a second terrestrial broadcaster as another content provider provides terrestrial broadcasts over channels '32-1' and '32-5' in the Chicago region, and also provides terrestrial broadcasts over the channels '32-1' and '32-5' in the New York region. Where the broadcasting regions of the first and second terrestrial broadcasters are different from each other, the first and second terrestrial broadcasters may transmit broadcasts, using the same channel number or different channel numbers.

Also, there may be various Internet broadcasters providing Internet broadcast contents other than the above-described broadcast contents, and private content providers providing contents such as Internet images.

The service provider packages broadcast contents provided by the first and second terrestrial broadcasters, contents such as Internet images provided by various Internet broadcasters, and contents provided by private content providers into a service, and provides the packaged service to the HNED or customer over an Internet network. The network provider provides the Internet network for the above-described services.

When it is assumed that an HNED or customer, who resides in San Diego, desires to watch broadcast contents provided by the first terrestrial broadcaster, the service provider, who provides IPTV services to the HNED or customer, must provide all the broadcast contents of the first and second terrestrial broadcasters provided in the Chicago region, the broadcast contents of the first and second terrestrial broadcasters provided in the New York region, and the contents provided by various Internet broadcasters and private content providers. For this reason, there may be the same existing channel number for different content provider types or different content provision regions. To this end, it is necessary to make a distinction among the contents at the side of the HNED or customer, in terms of the content provider type and content provision region.

In the example of FIG. 10, this requirement can be satisfied, using code values about content provision regions and code values about content sources as parts of multi-part channel information. For example, 3-part channel information such as 'content provision region'-'content source'-'existing channel number' information may be used. The 'content provision region'-'content source'-'existing channel number' information can be created, using information about the content provision region and content source, together with the existing channel number.

For example, it is assumed that the content provision region code value of Chicago is 110, the content provision region code value of New York is 497, a terrestrial broadcast content has a source code value of 001, and an Internet broadcast or private content has a source code value of 004.

In this case, when the HNED or customer inputs a value of 110-001-5-1, he/she can watch the content of the channel '5-1' selected from among the broadcast contents of the first terrestrial broadcaster provided in Chicago. When the HNED or customer inputs a value of 497-002-5-2, it is possible to watch the contents of the channel '5-2' selected from among the broadcast contents of the first terrestrial broadcaster provided in New York.

For the Internet broadcast contents or private contents, it may be unnecessary to make a distinction among content provision regions, by virtue of the characteristics of the Internet. In this case, it is possible to make a distinction among channels, using only the 2 parts of the 3-part channel information, namely, 'content source' and 'existing channel number', without using the content provision region identification information part.

For an Internet broadcast content or private content, a channel number may be used, if there is an existing channel number corresponding to the channel number. An IP address, at which the content is stored, may also be used. If there is no existing channel number, the IP address, at which the content is stored, may be input.

The above-described 3-part channel information has been specified only for illustrative purposes. The order of the parts in the channel information may be changed. In addition, each part may be represented by a text, instead of a numeral value. Alternatively, each part may be represented by a combination of a numeral and a text.

Figure 11:
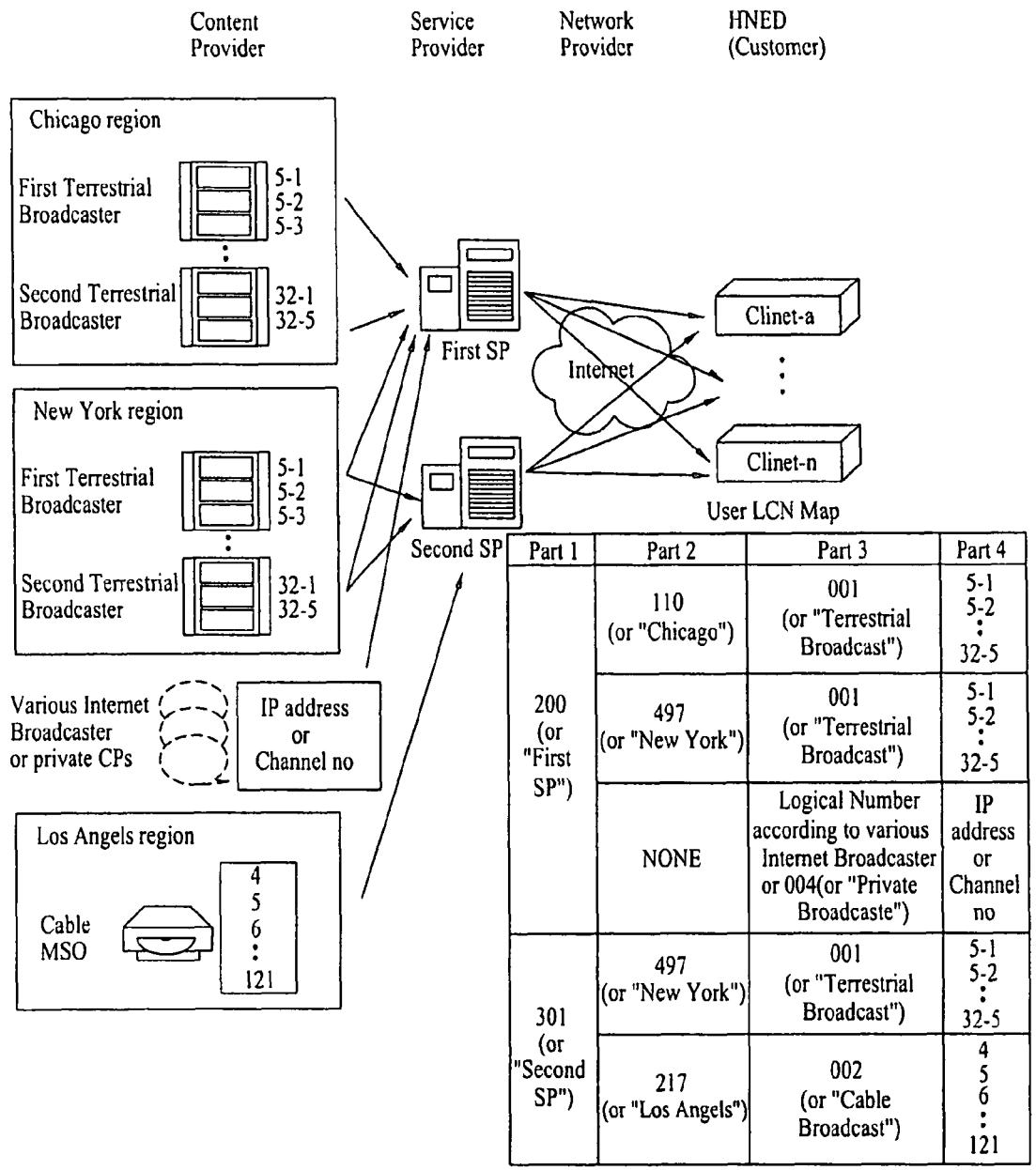
FIG. 11 is a view showing an example of use of provider identification information, region identification information, and content source identification information as parts of multi-part channel information, according to one embodiment of the present invention.

FIG. 11 shows an example of use of provider identification information, region identification information, and content source identification information as parts of multi-part channel information, according to one embodiment of the present invention. In the example of FIG. 11, multi-part channel information is implemented using the provider identification information, region identification information, and content source identification information.

Where there are a plurality of service providers each packaging broadcast contents provided by content providers into a service, and providing the packaged service to the HNED or customer over an Internet network, the HNED or customer can receive such a service from at least one service provider selected from among the service providers after subscribing to the selected service provider. Thus, the HNED or customer can receive a desired content after selecting a service corresponding to the content from among subscribed services.

In the example of FIG. 11, a first terrestrial broadcaster as one content provider provides terrestrial broadcasts over channels '5-1', '5-2', and '5-3' in a Chicago region, and also provides terrestrial broadcasts over the channels '5-1', '5-2' and '5-3' in a New York region. On the other hand, a second terrestrial broadcaster as another content provider provides terrestrial broadcasts over channels '32-1' and '32-5' in the Chicago region, and also provides terrestrial broadcasts over the channels '32-1' and '32-5' in the New York region. Where the broadcasting regions of the first and second terrestrial broadcasters are different from each other, the first and second terrestrial broadcasters may transmit broadcasts, using the same channel number or different channel numbers.

A cable MSO in a Los Angeles region as another content provider provides cable broadcasts over channels '4', '5', '6', . . . , and '121'. Also, there may be various Internet broadcasters providing Internet broadcast contents other than the above-described broadcast contents, and private content providers providing contents such as Internet images.

A first service provider (SP) provides packages broadcast contents provided in Chicago and New York by the first and second terrestrial broadcasters, contents provided by various Internet broadcasters, and contents provided by private content providers into a service, and provides the packaged service to the HNED or customer over an Internet network. A second service provider (SP) provides packages broadcast contents provided in New York by the first and second terrestrial broadcasters, broadcast contents provided in a Los Angeles region by the cable MSO, and contents provided by various Internet broadcasters and private content providers into a service, and provides the packaged service to the HNED or customer over an Internet network.

For this reason, there may be the same existing channel number for different service providers, different content provider types, and different content provision regions. To this end, it is necessary to make a distinction among the contents at the side of the HNED or customer, in terms of the content provider type and content provision region.

In the example of FIG. 11, this requirement can be satisfied, using code values about service providers, code values about content provision regions, and code values about content sources as parts of multi-part channel information. For example, 4-part channel information such as 'service provider'-'content provision region'-'content source'-'existing channel number' information may be used. The 'service provider'-'content provision region'-'content source'-'existing channel number' information can be created, using information about the service provider, content provision region, and content source, together with the existing channel number.

For example, it is assumed that an HNED or customer residing in San Diego has subscribed to services of the first and second service providers selected from among a plurality of service providers, and desires to watch a broadcast content of the first terrestrial broadcaster.

It is also assumed that the first service provider has a code value of 200, the second service provider has a code value of 301, Chicago has a content provision region code value of 110, New York has a content provision region code value of 497, Los Angeles has a content provision region code value of 217, a terrestrial broadcast content has a source code value of 001, a cable broadcast content has a source code value of 002, and an Internet broadcast or private content has a source code value of 004.

In this case, when the HNED or customer inputs a value of 200-110-001-5-1, he/she can watch the '5-1'-channel broadcast content of the first terrestrial broadcaster provided in Chicago and selected from among the contents provided by the first service provider. When the HNED or customer inputs a value of 301-497-002-5-2, it is possible to watch the contents of the '5-2'-channel broadcast content of the first terrestrial broadcaster provided in New York and selected from among the contents provided by the second service provider. Upon inputting a value of 301-217-002-6, the HNED or customer can watch the contents of the '6'-channel broadcast content of the cable MSO provided in Los Angeles and selected from among the contents provided by the second service provider.

For the Internet broadcast contents or private contents, it may be unnecessary to make a distinction among content provision regions, by virtue of the characteristics of the Internet. In this case, it is possible to make a distinction among channels, using only the 3 parts of the 4-part channel information, namely, 'service provider', 'content source', and 'existing channel number', without using the content provision region identification information part.

For an Internet broadcast content or private content, a channel number may be used, if there is an existing channel number corresponding to the channel number. An IP address, at which the content is stored, may also be used. If there is no existing channel number, the IP address, at which the content is stored, may be input.

The above-described 4-part channel information has been specified only for illustrative purposes. The order of the parts in the channel information may be changed. In addition, each part may be represented by a text, instead of a numeral value.

FIG. 12 shows a record including information of a service provider according to one embodiment of the present invention. The receiver is able to receive various information of a content provider, network provider and service provider via the above-mentioned record, and at the same time is able to store the same information. For example, the above-mentioned information stored in the receiver may include region identification information, provider identification information, channel level identification information, provider connection information, etc.

In order to provide the user with content data, the receiver must search for a content server having user-desired content data stored therein, and must connect to the searched content server. The receiver may connect to an entry point of an IPTV portal (or system operator (SO)) provided from the network provider. The entry point is indicative of a kind of access point. The user may enter either the IP address/port of the entry point of the IPTV portal or a domain name system (DNS) uniform resource locator (URL), or may selectively enter a pre-registered address. Otherwise, the receiver may automatically access the pre-selected address.

At the entry point of the IPTV portal, the service provider record including each service provider information is transmitted to the receiver.

FIG. 12 shows the service provider discovery record of the digital video broadcasting (DVB)-IP. The above-mentioned service provider discovery record is considered to be a preferred embodiment including the provider identification information, the provider connection information, etc.

In the above-mentioned example, information of the service provider discovery record is contained in the "ServiceDiscovery". "@Version" is indicative of version information of the record. If the version information is changed, this indicates that data of the above-mentioned record has been changed. "LogicalEntryNumber" includes logical number information of the entry point transferring the service provider discovery record. The above-mentioned logical number information may be adapted to identify the network provider in multi-part channel information.

The information of the service provider is contained in the "ServiceDiscovery/ServicProviderDiscovery/ServiceProvider".

"@DomainName" includes Internet DNS domain name information of the service provider. This Internet DNS domain name information is used to identify the service provider. "@version includes version information of the service provider discovery record. "@LogoURI" includes a pointer to the logo of the service provider.

"Name" includes a name of the service provider. The service provider's name may be provided in one or more languages. "Description" includes description information associated with the service provider. The above-mentioned description information of the service provider may be provided in one or more languages.

"Offering List" information of the service provider is contained in "ServiceDiscovery/ServiceProviderDiscovery/ServiceProvider/Offering".

"Push@Source" "Push@Address", and "Push@Port" include a port number for providing the DVB IP offering record in multicast (i.e., push mode), and information of the IP address. The "DVB IP offering" record includes not only Internet DNS domain name information for identifying the service provider, but also version information of the above-mentioned record.

"Push@Location" includes address information for providing the DVB IP offering record upon receipt of a specific request (i.e., pull mode).

In the case of the pull mode, the "Payload list" information of the above-mentioned record is contained in the "ServiceDiscovery/ServicProviderDiscovery/ServiceProvider/Offering/Pull/Payload". In the case of the push mode, the "Payload list" information of the above-mentioned record is contained in the "ServiceDiscovery/ServicProviderDiscovery/ServiceProvider/Offering/Push/Payload".

"PayloadId@Id" includes identifier (ID) information of the service discovery information type for use in the DVB IP offering. There are a variety of service discovery information types, for example, a broadcast discovery record or a CoD (Content on Demand) discovery record, etc.

"Segment@Id" includes ID information of a segment including service discovery information corresponding to the above-mentioned "PayloadId@Id". "Segment@Version" includes version information of a segment identified by the above-mentioned ID information.

"LogicalSPNumber" includes logical number information of the service provider. This "LogicalSPNumber" information may be used as information for identification of the service provider in the multi-part channel information.

In the record of FIG. 12, "@DomainName", "@Version", and "Name" information must be contained mandatorily. In the case of using "Push@Source" information, the record of FIG. 12 must include "Push@Address" and the Push@Port" information. However, it should be noted that the "Push@Source" is optionally used. If the above-mentioned record information is provided to the user during only the pull mode, the record of FIG. 12 must mandatorily include the "Segment@Id". Otherwise, if the above-mentioned record information is provided to the user during only the push mode, the above-mentioned "Segment@Id" is optionally used. The remaining information other than the aforementioned information is optionally used.

FIG. 13 shows an implementation example of the record shown in FIG. 12 according to one embodiment of the present invention. In more detail, FIG. 13 shows the implementation example of the above-mentioned record using the eXtensible Markup Language (XML), which includes the provider identification information, the provider connection information, etc., according to the record structure of FIG. 12.

"LogicalEntryNumber" includes a logical number "1" of the entry point which has transmitted the service provider discovery record.

A lower part of the "ServiceProviderDiscovery" includes information of each service provider. A first "ServiceProvider" field includes connection information, logical number information, etc. of a first service provider.

The "Name" field of FIG. 13 includes the service provider's domain name "provider1.com", the pointer of the service provider's logo, and version information. In addition, the "Name" field further includes the service provider's name "Provider1". "Description" includes "provider1 ADSL TV Offer" indicating the description of the service provider. "LogicalSPNumber" includes the logical number information "1" for identifying the first service provider.

A first "Push" includes not only the IP address (224.1.1.5)/Port number (1234) capable of receiving the DVB IP offering record under the multicast (i.e., push mode), but also the source address (192.100.100.70). The "Payload Id" located at a lower part of the first "Push" includes ID information of record information received from the above-mentioned address. In FIG. 13, specific information, which has the value of 5 and ID information of the value "5", is indicative of a package discovery record. The ID information of the segment including the package discovery record is "0", and its version information is "0".

A second "Push" includes the IP address (224.1.1.2)/Port number (1234) capable of receiving another DVB IP offering record under the multicast (i.e., push mode). The "Payload Id" located at a lower part of the second "Push" includes ID information of record information received from the above-mentioned address. In FIG. 13, specific information, which has the value of 2 and ID information of the value "2", is indicative of a broadcast discovery record. The ID information of the segment including the broadcast discovery record is "0", and its version information is "0".

The second "ServiceProvider" located at a lower part of the "ServiceProviderDiscovery" includes connection information of the second service provider, etc.

The "Name" field includes the service provider's domain name "provider2.com", the pointer of the service provider's logo, and version information. In addition, the "Name" field further includes the service provider's English name "Provider2". "Description" includes "provider2 ADSL TV Offer" indicating the description of the service provider. "LogicalSPNumber" includes the logical number information "2" for identifying the second service provider.

The first "Push" includes not only the IP address (224.1.1.6)/Port number (1234) capable of receiving the DVB IP offering record under the multicast (i.e., push mode), but also the source address (192.100.100.75). Specific information contained in the "Payload Id" of the first "Push" has the value of 5, and this information is indicative of a package discovery record including the above-mentioned ID information. The above-mentioned "Payload Id" includes ID information of a segment including the package discovery record, and its version information.

The second "Push" includes the IP address (224.1.1.2)/Port number (1234) capable of receiving another DVB IP offering record under the multicast (i.e., push mode). Specific information contained in the "Payload Id" of the second "Push" has the value of 5, and this information is indicative of a broadcast discovery record including the above-mentioned ID information. The above-mentioned "Payload Id" includes ID information of a segment including the broadcast discovery record, and its version information.

The receiver receives the service provider discovery record, and stores the provider identification information and the connection information contained in the record. If additional information (e.g., the region identification information, the channel level identification information, etc.) other than the above-mentioned information are further contained in the record, the receiver further stores the above-mentioned additional information. The receiver creates a channel map using the above-mentioned stored information, and uses the channel map to make a channel distinction according to multi-part channel information.

The receiver analyzes the service provider discovery record and thus connects to a server of a service provider that provides a service desired by the user. Then, the service provider provides a service discovery record including content information to the receiver.

FIG. 14 shows a record including content information according to one embodiment of the present invention. The receiver is able to receive/store a variety of information of contents via the above-mentioned record. For example, the information may include provider identification information, region identification information, content source identification information, content genre identification information, content data characteristic identification information, channel level identification information, provider connection information, etc.

FIG. 14 shows a broadcast discovery record of DVB-IP as an example of the service discovery record. The broadcast discovery record of FIG. 14 includes content source identification information, content provider identification information, content provision region identification information, content data characteristic identification information, provider connection information, etc. The above-mentioned service discovery record refers to a discovery record of a content service.

There are a variety of service discovery records of the DVB-IP, i.e., a Content On Demand (COD) discovery record, a package discovery record, etc. The broadcast discovery record includes live media content information such as a real-time video stream.

In the above-mentioned example, the broadcast discovery record information is contained in the "BroadcastDiscovery". The service list information is contained in the "BroadcastDiscovery/ServiceList".

If BCG record's ID information associated with the BCG (Broadband Content Guide) discovery exists, "ServiceDescriptionLocation" includes the above-mentioned ID information, and "@preferred" includes location information of a preferred BCG. The BCG includes content guide information of the DVB-IP corresponding to an electronic program guide (EPG).

Various information of the content service is contained in "BroadcastDiscovery/ServiceList/SingleService".

"SourceType" includes information for identifying a source, e.g., a terrestrial broadcast, satellite broadcast or cable broadcast with respect to a specific content service. "LogicalChannelNumber" includes logical number information of each content service. The above-mentioned information may also be used as content source identification information and content provider identification information in the multi-part channel information, respectively. "RegionNumber" includes information of a region where the content service is provided. This information may also be used as content provision region identification information in the multi-part channel information.

"TextualID@DomainName" includes an Internet DNS domain name for identifying a service provider. "TextualID@ServiceName" includes a host name of a service provided from the service provider.

"DVBTriplet" includes DVB Triplet information associated with the service. Specifically, "DVBTriplet@OrigNetId" includes original_network_id information. "DVBTriplet@TSId" includes transport_stream_id information. "DVBTriplet@@ServiceId" includes service id information. "MaxBitrate" includes maximum bit rate information of a stream transferring the service.

Location information of the content service is contained in "BroadcastDiscovery/ServiceList/SingleService/ServiceLocation".

"IPMulticastAddress@Source", "IPMulticastAddress@Address", and "IPMulticastAddress@Port" inform the user that the Internet Group Management Protocol (IGMP) for accessing the above-mentioned service has been used, and include an URL capable of accessing the service and port information. A unicast address associated with a transport stream (TS) source may be optionally included.

"RTSPURL" indicates that the Real-Time Streaming Protocol (RTSP) for accessing the service has been used, and includes information of a URL capable of accessing the service.

"AudioAttributes" includes not only an audio coding algorithm to be used in the aforementioned service, but also objective information. "VideoAttributes" includes detailed information associated with video coding to be used in the aforementioned service. The audio attribute value and the video attribute value may also be used as characteristic identification information of the content data in the multi-part channel information.

In the record of FIG. 14, "TextualID@ServiceName", "DVBTriplet@OrigNetId", "DVBTriplet@TSId", and "DVBTriplet@ServiceId" information must be mandatorily contained. If "IPMulticastAddress@Source" is used, "IPMulticastAddresss@Address" and "IPmulticastAddress@Port" must be mandatorily contained in the record of FIG. 14. The remaining information other than the above-mentioned information is optionally used.

The receiver receives the above-mentioned service discovery record, and stores a variety of information contained in the above-mentioned record, for example, content source identification information, content provider identification information, content provision region identification information, content data characteristic identification information, provider connection information, etc. If region identification information, content genre identification information, and channel level identification information are additionally contained in the above-mentioned record, the receiver also stores the above-mentioned additional information. The receiver creates a channel map using the above-mentioned stored information, and uses the channel map to make a channel distinction according to multi-part channel information.

The receiver analyzes the above-mentioned service discovery record, and connects to a server of a content provider capable of providing user-desired content data according to the analyzed result, so that it can allow the user to watch the desired content data.

Figure 15:
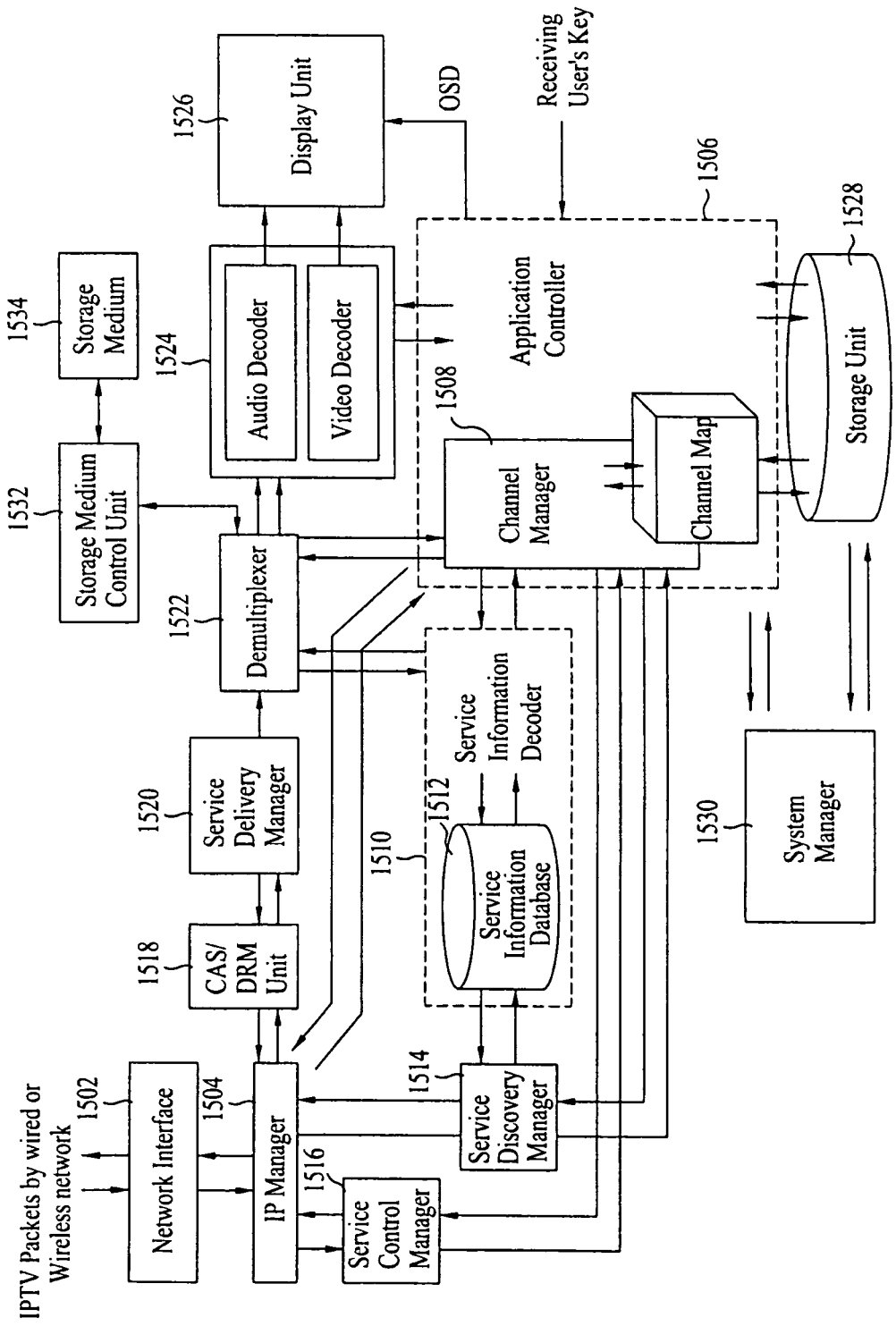
FIG. 15 is a block diagram schematically showing the configuration of a receiver according to one embodiment of the present invention.

FIG. 15 is a block diagram schematically showing the configuration of a receiver according to one embodiment of the present invention.

The receiver includes a network interface 1502, an IP manager 1504, an application/UI manager 1506, a channel manager 1508, a service information decoder 1510, a service information database 1512, a service discovery manager 1514, service control manager 1516, a CAS/DRM unit 1518, service delivery manager 1520, a demultiplexer 1522, an audio/video decoder 1524, display unit 1526, a storage unit 1528, a system manager 1530, a storage medium controller 1532, and a storage medium 1534.

The network interface 1502 receives packets from a network and transmits packets from the receiver to the network. The IP manager 1504 engages in packet delivery from sources to destinations with respect to a packet which is received by the receiver and a packet which is transmitted by the receiver. Also, the IP manager 1504 classifies received packets such that the received packets correspond to appropriate protocols.

The application/UI manager 1506 provides a Graphic User Interface (GUI) for the user using an On Screen Display (OSD), etc., and receives a key input from the user and performs an operation of the receiver based on the key input. For example, if the application/UI manager 1506 receives a key input for channel selection from the user, then it transmits the received key input to the channel manager 1508.

The channel manager 1508 creates a channel map. Also, the channel manager 1508 selects a channel based on the key input received from the application/UI manager 1506, and controls the service discovery manager 1514. The channel manager 1508 receives service information of the selected channel from the service information decoder 1510 and performs setting of an audio/video Packet Identifier (PID) of the selected channel in the demultiplexer 1522, etc. based on the received service information.

The service information decoder 1510 decodes service information such as Program Specific Information (PSI). That is, the service information decoder 1510 receives and decodes a PSI section, Program and Service Information Protocol (PSIP) section, DVB-Service Information (SI) section, etc. demultiplexed by the demultiplexer 1522.

The service information decoder 1510 decodes the received sections to create a database regarding the service information, and stores the database regarding the service information in the service information database 1512.

The service discovery manager 1514 provides information required for selection of a service provider. If the service discovery manager 1514 receives a signal for channel selection from the application/UI manager 1506, then it searches for a corresponding service using the above service information.

The service control manager 1516 takes charge of selection and control of a service. For example, the service control manager 1516 performs the service selection and control by using an IGMP or RTSP when the user selects a Live Broadcasting service as in an existing broadcasting system, and by using the RTSP when the user selects a service such as Video On Demand (VOD). The RTSP can provide a trick mode for real-time streaming.

A service-related packet received through the network interface 1502 and IP manager 1504 is transmitted to the CAS/DRM unit 1518. The CAS/DRM unit 1518 takes charge of Conditional Access System (CAS) and Digital Rights Management (DRM).

The service delivery manager 1520 takes charge of control of service data received. For example, the service delivery manager 1520 uses a Real-Time Transport Protocol (RTP)/RTP Control Protocol (RTCP) for control of real-time streaming data. Because the real-time streaming data is transmitted using the RTP, the service delivery manager 1520 delivers the received data packet to the demultiplexer 1522 by parsing it according to the RTP. Also, the service delivery manager 1520 feeds information received from the network back to a service providing server using the RTCP.

The demultiplexer 1522 demultiplexes a received packet into audio data, video data, Program Specific Information (PSI) data, etc. and transmits the audio data, video data, PSI data, etc. to the video/audio decoder 1524 and the service information decoder 1510, respectively.

The video/audio decoder 1524 decodes the video data and audio data received from the demultiplexer 1522. The video data decoded by the video/audio decoder 1524 is provided to the user through the display unit 1526 and the audio data decoded thereby is provided to the user through a speaker (not shown).

The storage unit 1528 stores system setup data, etc. This storage unit 1528 may be, for example, a NonVolatile RAM (NVRAM) or flash memory. The system manager 1530 controls the entire operation of the receiver system through power.

The storage medium controller 1532 controls the storage medium 1534 to store video/audio data on the storage medium 1534 or read and reproduce data stored on the storage medium 1534. The storage medium 1534 receives and stores the video/audio data from the video/audio decoder 1524 under the control of the storage medium controller 1532.

The receiver connects to an entry point of an IPTV portal to receive a packet of a service provider discovery record as shown in FIG. 12, and the network interface 1502 transmits the received packet to the IP manager 1504. The IP manager 1504 determines whether the destination of the received packet is the receiver, and then transmits the received packet to an appropriate manager block according to a transmission/reception protocol.

The packet including the service provider discovery information is transmitted using a protocol associated with service discovery and selection. For example, for DVB-IP, the packet is transmitted according to a Service Discovery & Selection (SD&S) protocol or Service Discovery Protocol (SDP). As a result, the IP manager 1504 transmits the packet including the service provider discovery information to the service discovery manager 1514.

The service discovery manager 1514 obtains various information of the service provider discovery record included in the received packet by parsing that packet. Then, the service discovery manager 1514 transmits the obtained information to the service information database 1512 and stores it therein. This information includes region identification information, provider identification information, channel level identification information, provider connection information, etc.

The receiver can receive a packet including service discovery information from a service provider using service provider connection information included in the service provider discovery record. The packet including the service discovery information is transmitted/received using the SD&S protocol (or SDP).

The packet including the service discovery information is transmitted to the IP manager 1504 via the network interface 1502. The IP manager 1504 determines whether the destination of the received packet is the receiver, and then transmits the received packet to the service discovery manager 1514. The service discovery manager 1514 obtains the service discovery information included in the received packet. Then, the service discovery manager 1514 transmits the obtained information to the service information database 1512 and stores it therein. This information includes provider identification information, region identification information, content source identification information, content genre identification information, content data characteristic identification information, channel level identification information, provider connection information, etc.

The service information database 1512 stores and manages the received various information. The channel manager 1508 creates and manages a channel map using the various information stored in the service information database 1512. If multi-part channel information is inputted, the channel manager 1508 connects to a server in which a content of a corresponding channel is stored, using the channel map, so that the user can watch the content.

The application/UI manager 1506 receives channel information corresponding to a desired content from the user and controls a channel change based on the channel map. That is, the application/UI manager 1506 receives, from the user, multi-part channel information corresponding to a content that the user wants to watch, and performs a channel change to a channel corresponding to the received channel information based on the channel map. The received multi-part channel information may be a combination of numerals, a combination of numerals and texts or a combination of texts.

For input of the multi-part channel information, the user may input information of all parts of the multi-part channel information personally or through a kind of guide menu using an OSD, such as an EPG. Alternatively, information that can be inputted for each part of the multi-part channel information may be displayed or sorted so as to be selected by the user. It is also possible to perform a fast search operation of, if a specific condition of a specific part is inputted, searching for a corresponding channel and allowing the user to select it, or a search operation of, whenever information of each part is inputted, excluding channels that do not correspond to the inputted information.

Any one of the various embodiments of the multi-part channel information formats as stated above must be predefined in the receiver, and the user selects a desired channel according to the predefined format. The multi-part channel information format in the receiver can be preset and used by the user. Alternatively, a format determined by convention, etc. may be used in common in all receivers.

The application/UI manager 1506 performs the channel changes and connects to a server of the changed channel via the IP manager 1504 and network interface 1502. A service stream provided from the server is transmitted to the IP manager 1504 via the network interface 1502. Then, the service stream is delivered to the demultiplexer 1522 via the CAS/DRM unit 1518 and service delivery manager 1520.

The demultiplexer 1522 demultiplexes the received stream and transmits the demultiplexed data to the audio/video decoder 1524. The audio/video decoder 1524 transmits the decoded data to the display unit 1526 to provide it to the user.

Figure 16:
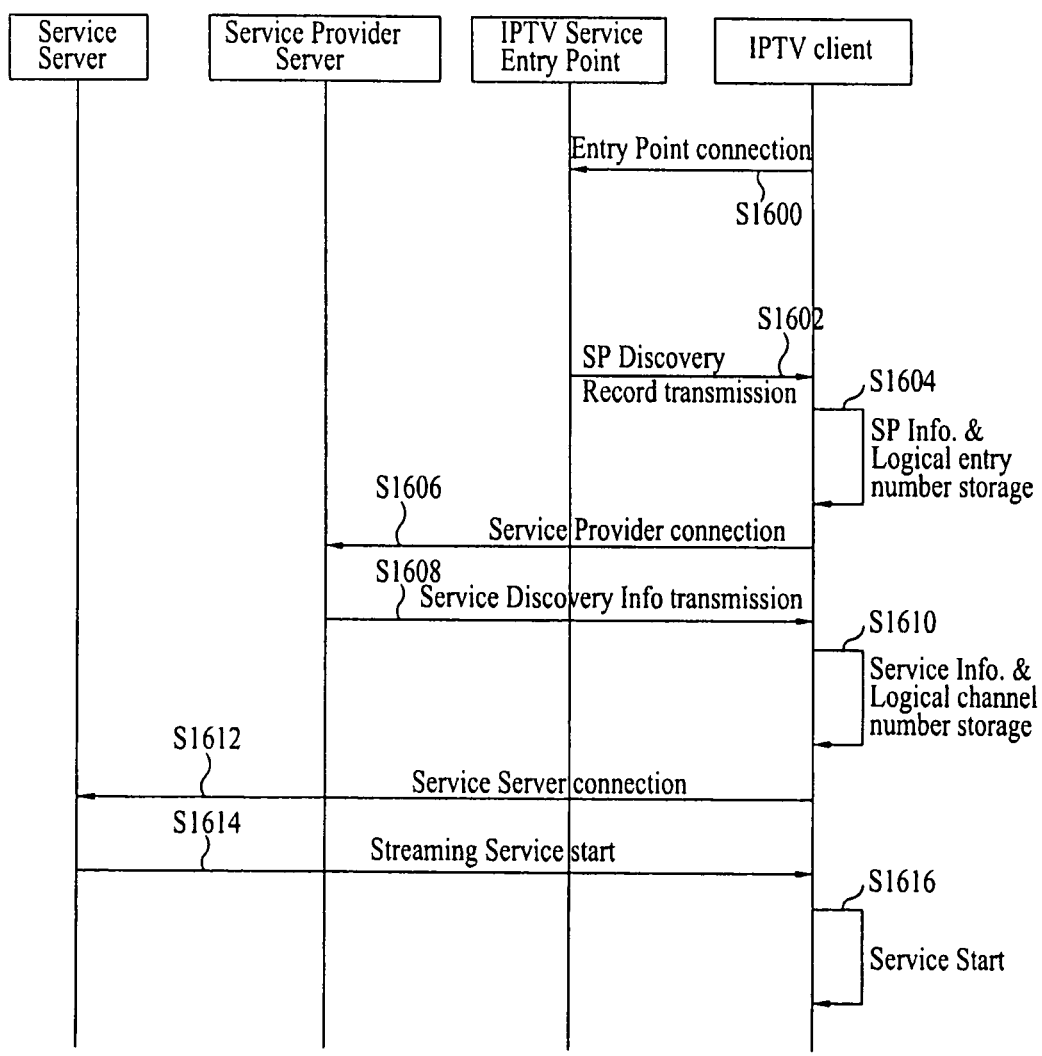
FIG. 16 is a flowchart schematically illustrating a process of processing multi-part channel information, according to one embodiment of the present invention.

FIG. 16 is a flowchart schematically illustrating a process of processing multi-part channel information, according to one embodiment of the present invention. FIG. 16 shows the flow and sequence of signals among a service server, a server of a service provider, an entry point of an IPTV portal, and a receiver. The service server refers to a server that stores contents. For the convenience of description, it is assumed that the records described in FIG. 12 and FIG. 14 are used.

The receiver connects to the entry point of the IPTV portal, which is provided by a network provider (S1600). The IPTV portal can check subscription information, etc. of the connected receiver. That is, by checking the subscription information, etc., the IPTV portal can determine whether the receiver is a receiver capable of receiving a service linked to the IPTV portal.

The entry point of the IPTV portal transmits a service provider discovery record including various information about the network provider or service provider to the receiver (S1602).

The receiver stores the various information included in the received service provider discovery record (S1604). This information includes region identification information, provider identification information, channel level identification information, provider connection information, etc.

The receiver connects to the server of the service provider using service provider connection information among the aforementioned information (S1606). If there is a connection from the receiver, the server of the service provider transmits a service discovery record including various information about contents (S1608).

The receiver receives the service discovery record and stores the various information included in the received record (S1610). This information includes provider identification information, region identification information, content source identification information, content genre identification information, content data characteristic identification information, channel level identification information, provider connection information, etc.

The receiver receives multi-part channel information of a content desired by the user and performs a channel change to a channel corresponding to the received multi-part channel information using the stored various information. The received multi-part channel information may be a combination of numerals, a combination of numerals and texts or a combination of texts. Any one of the various embodiments of the multi-part channel information formats as stated above must be predefined in the receiver, and the user selects a desired channel according to the predefined format.

If the user inputs the multi-part channel information of the desired content, the receiver connects to a service server of the desired content (S1612). The service server transmits a service data streaming, etc. to the connected receiver to start a service (S1614). The receiver displays data received from the service server to provide the service to the user (S1616).

The multi-part channel information as described above is applicable not only to IPTV systems such as DVB in Europe, ATIS in North America and IPTV of ITU-T, but also to all broadcasting systems capable of providing the user with various broadcast contents in channel form.

As apparent from the above description, the channel information processing method, broadcast contents receiving method and receiver according to the present invention have effects as follows. According to the present invention, it is possible to easily distinguish various content channels from one another. Further, using various information about channels, a channel information format can be edited and a desired channel can be readily searched for.

Furthermore, according to the present invention, it is possible to make a channel distinction under the condition of utilizing existing channel numbers used by content providers as they are.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing channel information of a receiver, the method comprising:
   attaching to at least one IPTV service provider and receiving provisioning information; and
   receiving service identification information including multi-part channel number information by using the provisioning information, wherein the multi-part channel number information includes a first channel number specified for terrestrial broadcast service providing a content, a second channel number indicating a geographical location of the terrestrial broadcaster providing the terrestrial broadcast service, and a third channel number indicating a service provider which packages channels provided by contents providers into a service to provide a packaged service through a delivery channel
   wherein a logical channel number is expanded to the first channel number, the second channel number and the third channel number, the expanded logical channel number being different from a major or minor channel number,
   the second channel number is used for distinguishing channels having the same first channel number and from the different geographic locations, and the third channel number is used for distinguishing identical channels delivered by different service providers, wherein the second channel number is used for searching and accessing contents from plurality of local stations by identifying the location of the terrestrial broadcaster, and the third channel number is used for searching and accessing contents from plurality of service providers by identifying the service providers, wherein the service provider is distinguished from a network provider which provides the delivery channel, and the third channel number is distinguished from identification information of the network provider.

2. The method of claim 1, wherein the multi-part channel number information further includes fourth channel number indicating source type of the contents, wherein the source type indicates a source of the content which is at least one of terrestrial broadcast, cable broadcast, satellite broadcast and private broadcast.

3. The method of claim 1, the method further comprising, receiving inputted signal according to the expanded logical channel number.

4. The method of claim 1, wherein the multi-part channel number information further includes a fifth channel number indicating a genre of the content.

5. A method of processing channel information of a receiver, the method comprising:

receiving service discovery information including a first channel number specified for terrestrial broadcast service providing a content, a second channel number indicating a geographical location of the terrestrial broadcaster providing the terrestrial broadcast service;

receiving service provider discovery information including a third channel number indicating service provider which packages channels provided by contents providers into a service to provide a packaged service through a delivery channel;

storing the first channel number and the second channel number included in the service discovery information and the third channel number included in the service provider discovery information, wherein a logical channel number is expanded to the first channel number, the second channel number and the third channel number, the expanded logical channel number being different from a major or minor channel number, the second channel number is used for distinguishing channels having the same first channel number and from the different geographic locations, and the third channel number is used for distinguishing identical channels delivered by different service providers, wherein the second channel number is used for searching and accessing contents from plurality of local stations by identifying the location of the terrestrial broadcaster, and the third channel number is used for searching and accessing contents from plurality of service providers by identifying the service providers~ wherein the service provider is distinguished from a network provider which provides the delivery channel, and the third channel number is distinguished from identification information of the network provider.

6. The method of claim 5, further comprising, mapping the expanded logical channel number into a channel number field of a channel map.

7. The method of claim 5, wherein the service provider discovery information further includes fourth channel number, wherein the fourth channel number indicates a source of the content which is at least one of terrestrial broadcast, cable broadcast, satellite broadcast and private broadcast.

8. The method of claim 5, wherein the logical channel number is formed according to a preset channel number format defining order of the channel numbers which are combined in the logical channel number.

9. The method of claim 1, wherein the logical channel number is formed according to a preset channel number format defining order of the channel numbers which are combined in the logical channel number.

10. The method of claim 1, the method further comprising, mapping the expanded logical channel number into a channel number field of a channel map.

11. The method of claim 1, wherein the service identification information indicates further includes program guide information for one or more services.

12. A receiver comprising:

a network interface for receiving a packet including service identification information, and the service identification information including multi-part channel number information, wherein the multi-part channel number information includes a first channel number specified for terrestrial broadcast service providing a content, a second channel number indicating a geographical location of the terrestrial broadcaster providing the terrestrial broadcast service, and a third channel number indicating a service provider which packages channels provided by contents providers into a service to provide a packaged service through a delivery channel;

a service information decoder for decoding the packet and obtaining the service identification information including the multi-part channel number information; and a database for storing the service identification information, wherein a logical channel number is expanded to the first channel number, the second channel number and the third channel number, the expanded logical channel number being different from a major or minor channel number, the second channel number is used for distinguishing channels having the same first channel number and from the different geographic locations, and the third channel number is used for distinguishing identical channels delivered by different service providers, wherein the second channel number is used for searching and accessing contents from plurality of local stations by identifying the location of the terrestrial broadcaster, and the third channel number is used for searching and accessing contents from plurality of service providers by identifying the service providers:

wherein the service provider is distinguished from a network provider which provides the delivery channel, and the third channel number is distinguished from identification information of the network provider.

13. The receiver according to claim 12, wherein the service identification information indicates further includes program guide information for one or more services.

14. The receiver according to claim 12, wherein the multi-part channel number information further includes a fourth channel number indicating source type of the contents, wherein the source type indicates a source of the content which is at least one of terrestrial broadcast, cable broadcast, satellite broadcast and private broadcast.

15. The receiver according to claim 12, wherein the multi-part channel number information further includes a fifth channel number indicating a genre of the content.

16. The receiver according to claim 12, wherein the multi-part channel number information further includes a sixth channel number indicating a cost level of the content.

17. The receiver according to claim 12, wherein the multi-part channel number information further includes a seventh channel number indicating a video format of the content.

18. A method of processing channel information of a transmitter, the method comprising:
generating a first channel number specified for terrestrial broadcast service which provides a content, a second channel number indicating a geographical location of the terrestrial broadcaster providing the terrestrial broadcast service and a third channel number indicating a service provider which packages channels provided by contents providers into a service to provide a packaged service through a delivery channel;
generating multi-part channel number information including the first channel number, the second channel number and the third channel number;
inserting the multi-part channel number information to service identification information; and
transmitting the service identification information,
wherein a logical channel number is expanded to the first channel number, the second channel number and the third channel number, the expanded logical channel number being different from a major or minor channel number,
the second channel number is used for distinguishing channels having the same first channel number and from the different geographic locations, and
the third channel number is used for distinguishing identical channels delivered by different service providers,
wherein the second channel number is used for searching and accessing contents from plurality of local stations by identifying the location of the terrestrial broadcaster, and
the third channel number is used for searching and accessing contents from plurality of service providers by identifying the service providers,
wherein the service provider is distinguished from a network provider which provides the delivery channel, and
the third channel number is distinguished from identification information of the network provider.

\* \* \* \* \*